(12) United States Patent
Yamagata et al.

(10) Patent No.: US 8,141,357 B2
(45) Date of Patent: Mar. 27, 2012

(54) SUPERCHARGER FOR AN ENGINE

(75) Inventors: Naoyuki Yamagata, Higashihiroshima (JP); Mikihito Fujii, Aki-gun (JP); Susumu Masuyama, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 672 days.

(21) Appl. No.: 12/247,928

(22) Filed: Oct. 8, 2008

(65) Prior Publication Data

US 2009/0094978 A1  Apr. 16, 2009

(30) Foreign Application Priority Data

Oct. 12, 2007 (JP) ................ 2007-266533
Feb. 25, 2008 (JP) ................ 2008-042985

(51) Int. Cl.
*F02D 23/00* (2006.01)
*F02B 33/44* (2006.01)

(52) U.S. Cl. .............. 60/602; 60/601; 60/605.1
(58) Field of Classification Search .......... 60/601, 60/602, 605.1
See application file for complete search history.

(56) References Cited

U.S. PATENT DOCUMENTS

| | | | |
|---|---|---|---|
| 6,079,211 A * | 6/2000 | Woollenweber et al. | 60/612 |
| 6,250,079 B1 | 6/2001 | Zander et al. | |
| 2003/0070637 A1 * | 4/2003 | Majima | 123/90.15 |
| 2007/0180824 A1 * | 8/2007 | Yamagata | 60/599 |
| 2007/0227142 A1 * | 10/2007 | Blaylock et al. | 60/600 |
| 2008/0011278 A1 | 1/2008 | Yamagata | |

FOREIGN PATENT DOCUMENTS

| | | |
|---|---|---|
| EP | 0969186 A2 | 1/2000 |
| JP | 63018134 A | 1/1988 |
| JP | 09-112285 | 4/1997 |
| JP | 2000-080912 A | 3/2000 |
| JP | 2001-520346 A | 10/2001 |
| JP | 2001520346 A | 10/2001 |
| JP | 2004-068631 A | 3/2004 |
| JP | 2004245104 A | 9/2004 |
| JP | 2004332560 A | 11/2004 |
| JP | 2007231791 A | 9/2007 |
| JP | 2008019835 A | 1/2008 |

* cited by examiner

*Primary Examiner* — Thomas Denion
*Assistant Examiner* — Michael Carton
(74) *Attorney, Agent, or Firm* — Alleman Hall McCoy Russell & Tuttle LLP

(57) ABSTRACT

An engine system with a turbocharger is provided. The system may include an exhaust manifold having plural independent exhaust passages, each of the exhaust passages being connected to an exhaust port of a corresponding engine cylinder. The system may further include a collective part formed by gathering said independent exhaust passages in said exhaust manifold or on a downstream side of said exhaust manifold. The system may further include an exhaust turbocharger connected to a downstream side of said collective part. The system may further include a variable exhaust valve for changing each passage cross-sectional area of said independent exhaust passage at an upstream side of said collective part. The system may further include a controller for controlling said variable exhaust valve, wherein said controller is configured to perform independent exhaust throttle control for reducing a passage cross-sectional area of at least one of said independent exhaust passages.

6 Claims, 26 Drawing Sheets

SUPERCHARGER FOR AN ENGINE

TECHNICAL FIELD

This invention relates to an engine system with a supercharger.

BACKGROUND AND SUMMARY

Superchargers are known to increase engine output torque by increasing the intake air pressure. One well-known example of a supercharger is an exhaust turbocharger, hereinafter described as "a turbocharger."

Turbochargers typically include a turbine wheel ("a turbine") in an exhaust passage coupled by a shaft to a compressor wheel ("a compressor"). In operation, exhaust gas passing by the turbine spins a shaft which rotates the compressor and increases the intake pressure. The pressure increase in the intake air is sometimes referred to as charging the air, and the compressor output may be called charge air.

Although a turbocharger can obtain high charging pressure efficiently, it cannot necessarily increase engine torque in a broad engine speed range that includes both low and high engine speeds. Generally, a small-sized turbocharger increases the engine torque in a low engine speed range and a large-sized turbocharger increases the engine torque in a high engine speed range. Therefore, it may be necessary to select a turbocharger based on an engine torque characteristic when a turbocharger is provided with an engine.

However, many engine systems need to increase engine torque over a large engine speed range from low engine speed to high engine speed. To address this need, a variety of supercharging devices may be employed, such as a system with two turbochargers, one of which is used in a low engine speed range and the other of which is used in a high engine speed range; a system including an electric supercharger for use in a low engine speed range and a turbocharger for use in a high engine speed range; and a system including a turbocharger including a movable flap which may be adjusted according to the engine speed (a "variable-geometry turbocharger" as described in Japanese Unexamined Patent Application Publication No. 1997-112285).

Where a variable-geometry turbocharger is employed, it may be desirable to select a large-sized turbocharger as a base turbocharger.

In such a system, engine torque may be increased in a high engine speed range due to innate characteristics of the large-sized turbocharger. In a low engine speed range, engine torque may be increased by reducing the flap opening, which increases the exhaust flow rate and subsequently increases the turbine driving force. Accordingly, this system can increase engine torque over a large engine speed range.

However, a system including a variable-geometry turbocharger typically has a complicated structure. Further, the large size of these devices may crowd the engine room. Therefore, there is a need for an engine system with a turbocharger capable of increasing engine torque in a low engine speed range while having a simple structure.

One aspect of the present invention includes an engine system with a turbocharger comprising: an exhaust manifold having plural independent exhaust passages, each of the exhaust passages being connected to an exhaust port of a corresponding engine cylinder; a collective part formed by gathering said independent exhaust passages in said exhaust manifold or on a downstream side of said exhaust manifold; an exhaust turbocharger connected to a downstream side of said collective part; a variable exhaust valve for changing each passage cross-sectional area of said independent exhaust passage at an upstream side of said collective part; and a controller for controlling said variable exhaust valve, wherein said controller is configured to perform independent exhaust throttle control for reducing a passage cross-sectional area of at least one of said independent exhaust passages below a maximum area with said variable exhaust valve, at least in a predetermined low engine speed range in a supercharging operation range of said engine.

This system overcomes at least some of the disadvantages of the above-discussed references. Specifically, an exhaust gas ejector effect can be generated by the independent exhaust passages and a variable exhaust valve. This ejector effect, also referred as "a jet-pump," can extract a fluid with a vacuum generated by a driving fluid having a high flow velocity. In this specification, a vacuum operating on the same principle as this effect is hereinafter also called "the vacuum effect".

In the embodiments described in this description, exhaust gas, specifically, blow-down gas that flows with high flow rate just after an exhaust valve opens, flows in an independent exhaust passage. The area of the exhaust gas flow is narrowed by the variable exhaust valve, which reduces the passage cross-sectional area of the independent exhaust passage, causing the flow rate of the exhaust gas to increase and causing the pressure of the exhaust gas to decrease. Under these conditions, the exhaust gas corresponds to the driving fluid of the above-described ejector.

The exhaust gas may also flow through a collective part, by which an exhaust passage may communicate with other exhaust passages. As a result, the exhaust gas, functioning as a driving fluid, may suck out, or extract, an exhaust gas in another exhaust passage by the vacuum effect. To enhance this vacuum effect, it is desired that the exhaust gas functioning as a driving fluid merge with extracted exhaust gas at an acute angle.

The ejector has three major benefits, as follows.

First, the ejector effect can increase the turbine flow of the turbocharger, which is the amount of exhaust gas supplied to a turbocharger. The exhaust gas, functioning as a driving fluid, merges with the extracted exhaust gas in the collective part and the merged gas is introduced into a turbine located downstream of the collective part, which results in increasing turbine flow by the amount of extracted exhaust gas in comparison with the case of no ejector effect. Accordingly, the ejector effect can increase turbine driving force, thereby increasing charging pressure.

Second, the ejector effect may facilitate exhaust gas scavenging. Exhaust gas extracted by the ejector may serve as scavenged exhaust gas, which may decrease the exhaust resistance. Further, air inspiration during the overlap period (a period during which both an intake and an exhaust valve are open, such as during a transition from an exhaust stroke to an intake stroke) is enhanced by scavenging. As a result, intake volume may be increased, thereby increasing engine torque. To enhance this effect, the blow-down timing of one engine cylinder, which corresponds to the timing just after exhaust valve opening for one engine cylinder, may be adjusted to coincide with an overlap period for another engine cylinder. However, it is noted that such an example requires that the exhaust passages for each cylinder must be independent of each other at the upstream side of the variable exhaust valve.

Third, the ejector effect may also enhance a dynamic pressure charge. The dynamic pressure charge increases the charging performance of a turbocharger by using an exhaust pulsation. The effect may be enhanced as the exhaust pulsation becomes larger. Reducing the exhaust passage volume is an effective approach to enlarge the exhaust pulsation. However, reducing the total volume of the exhaust manifold to reduce the exhaust passage volume may be constrained by the exhaust system layout.

In prior approaches that do not include an ejector effect, exhaust gas from one exhaust passage may flow between exhaust passages in the collective part. In other words, exhaust gas from one exhaust passage may flow back into another exhaust passage. Unlike those approaches, the approach provided by an embodiment described in this description includes an ejector effect utilizing exhaust gas from one exhaust passage as a driving fluid, extracting fluid from another exhaust passage. Thus, exhaust gas from one exhaust passage does not flow back to another exhaust passage. This reduces an exhaust passage volume in a dynamic pressure charge operation.

Thus, the addition of the ejector effect can enhance a dynamic pressure charge in systems where the total volume of the exhaust passages and the exhaust manifold volume are the same.

Further, in some embodiments of this invention, it is desirable to include a large-sized turbocharger. In such a system, engine torque is increased by using an innate characteristic of the large-sized turbocharger in a high engine speed range. In a low engine speed range, engine torque is increased via the above-described ejector effect. Accordingly, this system can increase engine torque over large engine speed range from a low engine speed to a high engine speed.

In an example embodiment, said predetermined low engine speed range is a range where an engine speed is lower than a predetermined engine speed at which a waste gate valve of said exhaust turbocharger begins to open, wherein said controller is further configured to decrease said passage cross-sectional area as the engine speed becomes lower during said independent exhaust throttle control.

This may result in an effective ejector effect throughout an engine operating range, which may have fewer negative effects associated with the above described references, as described below.

The increase in charging pressure caused by the ejector effect is more pronounced when the engine speed is lower than the speed at which a waste gate valve of the turbocharger starts to open ("the intercept point").

When the engine speed is above the intercept point, the waste gate valve is opened to avoid excessive charging pressure. Thus, increasing the charging pressure with the ejector effect is unnecessary above the intercept point. Further, independent exhaust throttle control when the engine speed is above the intercept point may lead to an undesirable exhaust resistance.

Accordingly, in one embodiment the ejector effect is utilized when the engine speed is below the intercept point, providing an engine operating range in which independent exhaust throttle control is effective with few negative effects.

In a low engine speed range wherein the independent exhaust throttle control is performed, the demand for increased charging pressure grows as the engine speed is reduced. Further, the ejector effect grows as the exhaust passage cross-sectional area decreases. Therefore, reducing the exhaust passage cross-sectional area as the demand for increased charging pressure grows can magnify the charging pressure enhancement provided by the ejector effect.

In another example embodiment, the system further comprises an exhaust valve timing changing mechanism, wherein said controller is configured to retard an exhaust valve opening timing via said exhaust valve timing changing mechanism such that an exhaust valve opening timing at which said independent exhaust throttle control is performed is later than an exhaust valve opening timing at which said independent exhaust throttle control is not performed.

This may result in an effective ejector effect as described in detail below.

Under conditions wherein the independent exhaust throttle control is not performed, an exhaust valve starts to open early, before bottom dead center of the exhaust stroke. For example, the exhaust valve may open between 40 and 60 degrees of crank angle before bottom dead center. This may enhance scavenging while weakening the blow-down gas flow because the exhaust action starts when the piston is dropping. However, the weakened blow-down gas flow may be less effective as a driving fluid for the ejector effect, which may diminish the capabilities of the independent exhaust throttle control.

One approach to address this is to retard the exhaust valve opening timing. For example, the exhaust valve opening timing may be retarded to after bottom dead center of the exhaust stroke, which may inhibit the decrease in blow-down gas flow. Further, the piston begins to rise in the combustion chamber after the crank passes bottom dead center. This piston action, which may enhance the blow-down gas flow and the ejector effect, may be harnessed by delaying the opening of the exhaust valve until after the crank passes bottom dead center.

However, opening the exhaust valve after bottom dead center of the exhaust stroke may increase the exhaust resistance. Therefore, it may be desirable to open the exhaust valve at least just before bottom dead center of exhaust stroke, even when the exhaust valve opening is otherwise retarded.

In an example embodiment, the system further comprises a valve timing changing mechanism capable of changing an overlap period wherein both of an intake and an exhaust valve are opened by changing at least one of intake and exhaust valve opening or closing timing, wherein said controller is configured to enlarge said overlap period via said valve timing changing mechanism such that an overlap period at which said independent exhaust throttle control is performed is larger than an overlap period at which said independent exhaust throttle control is not performed.

This may result in an effective ejector effect as described in detail below.

As explained above, the independent exhaust throttle control of an embodiment of this invention may increase the intake air pressure, thereby increasing engine torque, caused, for example, by an enhancement in scavenging, an enhancement of an inspiration overlap period, etc. In this example embodiment, an ejector effect can be achieved by enlarging the overlap period via the valve timing changing mechanism when performing the independent exhaust throttle control.

Although enlarging the overlap period usually makes exhaust gas flow back toward the combustion chamber in response to a negative pressure condition caused by air intake, there is no backflow in this embodiment. Instead, the exhaust gas flows toward the downstream side of the exhaust passage in response to the ejector effect. In other words, in this example, the overlap period can be enlarged while reducing exhaust gas backflow.

Here, the above-described valve timing changing mechanism for enlarging the overlap period may be a device for advancing the intake valve opening timing, a device for retarding the exhaust valve closing timing, or a device for both of advancing intake valve opening timing and retarding exhaust valve closing timing. When a conventional variable valve timing (VVT) device that can move both of valve opening and closing timing backward and forward while maintaining the opening period is employed as the valve timing changing mechanism, and when this device is configured such that at least the exhaust valve closing timing is retarded, the exhaust valve opening timing is retarded automatically. In other words, this device is also used as the above-mentioned exhaust valve timing changing mechanism.

In an example embodiment, said controller is further configured to perform said independent exhaust throttle control in a naturally-aspirated range of said engine, and to enlarge said overlap period via said valve timing changing mechanism when said independent exhaust throttle control is performed, such that an overlap period at which said independent exhaust throttle control is performed in said naturally-aspirated range is larger than an overlap period at which said independent exhaust throttle control is not performed in said naturally-aspirated range.

This can enhance the response of the enlarged overlap period when switching from a naturally-aspirated range to a super-charging range as described below.

Generally, an engine with a valve timing changing mechanism is set such that the overlap period is enlarged at higher engine loads and/or at higher engine speeds. Therefore, an overlap period in a naturally-aspirated range that has a lower engine load range may be shorter than an overlap period in a super-charging range that has a higher engine load range, even at the same engine speed.

Thus, if the engine load is increased, for example by an acceleration demand, and the engine operating range quickly switches from a lower engine load range to a higher engine load range, a valve timing changing mechanism may correspondingly quickly increase the overlap period. When there is a large increase in the rate of change for the overlap period, a response lag between the valve timing change and the overlap period change may result.

Under some conditions where the amount of overlap increase is large, the response lag in changing valve timing may be significant. For example, the response lag may be significant in a supercharging operation range of the engine in which independent exhaust throttle control is used at the same time that the overlap period is increased.

Thus, according to one embodiment, independent exhaust throttle control is performed and the overlap period is enlarged in a naturally-aspirated range of said engine, reducing the response lag of changing valve timing when switching from a naturally-aspirated range to a super-charging range.

In an another example embodiment, the system further comprises a valve timing changing mechanism capable of changing at least one of an intake and an exhaust valve opening or closing timing and a fuel injector capable of changing an injected fuel amount to change an air-fuel ratio of a mixture provided in a combustion chamber of said engine, wherein said controller is further configured to perform an afterburning mode when said independent exhaust throttle control is performed, in which said controller controls said fuel injector to increase the air-fuel ratio in said combustion chamber to a richer than stoichiometric value, and controls said valve timing changing mechanism to enlarge an overlap period wherein both of the intake and the exhaust valve are opened to or above a predetermined range such that an unburned fuel is exhausted from said engine and combusted at an upstream side of said exhaust turbocharger.

In this embodiment, so-called "afterburning" occurs by creating conditions such that unburned fuel combusts upstream of the exhaust turbocharger when performing independent exhaust throttle control.

Afterburning refers to a phenomenon wherein unburned fuel is exhausted during the overlap period of the intake and the exhaust valves. Afterburning may result from a combination of setting the air-fuel ratio of mixture richer than stoichiometric value (but still within the burnable range) and mixing the exhausted unburned fuel with ambient air under the high pressure condition due to the increased blow-down peak caused by the ejector effect.

Engine output can be improved by enlarging the overlap period while performing independent exhaust throttle control. For example, increasing the overlap period can increase the scavenged burned gas, which may lead to improved charging efficiency, which may lead to improved engine output. Once the overlap period reaches a threshold, the engine output may remain constant despite continued enlargements to the overlap period. This change in output response may occur when the charge air remaining in the combustion chamber is no longer proportional to the amount of air passing through the combustion chamber in response to valve overlap.

However, the inventors herein have recognized that, if the overlap period continues to be increased after the engine output reaches the threshold described above, unburned fuel will be exhausted into the exhaust passage. This unburned fuel may combust at the upstream side of said exhaust turbocharger, which results in the afterburning phenomenon.

Afterburning can improve charging performance because it may increase the exhaust pressure, thereby increasing the charging pressure. Therefore, this embodiment can improve charging performance in a low engine speed range even when a large-sized turbocharger is adopted.

In one example embodiment, the system further comprises an electric supercharger provided in an air intake passage of said engine, wherein said controller is configured to activate said electric supercharger when said overlap period is within torque stationary range in said afterburning mode.

This embodiment can compensate for diminished engine output by operating an electric supercharger when intake and exhaust valves are operated with an overlap period and where afterburning does not occur.

As described above, when the overlap period is enlarged while performing independent exhaust throttle control, there may be a torque stationary range between an overlap amount for improving scavenging performance and an overlap amount for improving charging performance by afterburning phenomenon. Scavenging performance may be saturated and afterburning may occur within this range.

Therefore, in an embodiment wherein the intake and the exhaust valves are operated within the above-described range, an electric supercharger may sustain the charging performance to maintain engine output within a broad operating range. Further, if the electric supercharger is only operated in the above-described range, supercharger operation can be reduced.

In one example embodiment, said controller is configured to adjust said overlap period to more than a ninety-degree crank angle in said afterburning mode.

This embodiment may trigger the afterburning phenomenon with high probability under engine operating conditions where an afterburning mode should be performed, which may result in improved charging performance and engine output.

The above advantages and other advantages and features of the present description will be readily apparent from the following Detailed Description when taken alone or in connection with the accompanying drawings.

BRIEF DESCRIPTION OF DRAWINGS

FIG. 6A shows a state when the valve is closed, and FIG. 6B shows a state when the valve is open.

FIG. 7A shows a case when a sector-shaped flap is used, and FIG. 7B shows a case when a common plate-like flap is used.

FIG. 23 is an exhaust characteristic plot, where

DETAILED DESCRIPTION

Hereafter, embodiments of the present invention will be described referring to the accompanying drawings.
Embodiment 1

Figure 1:
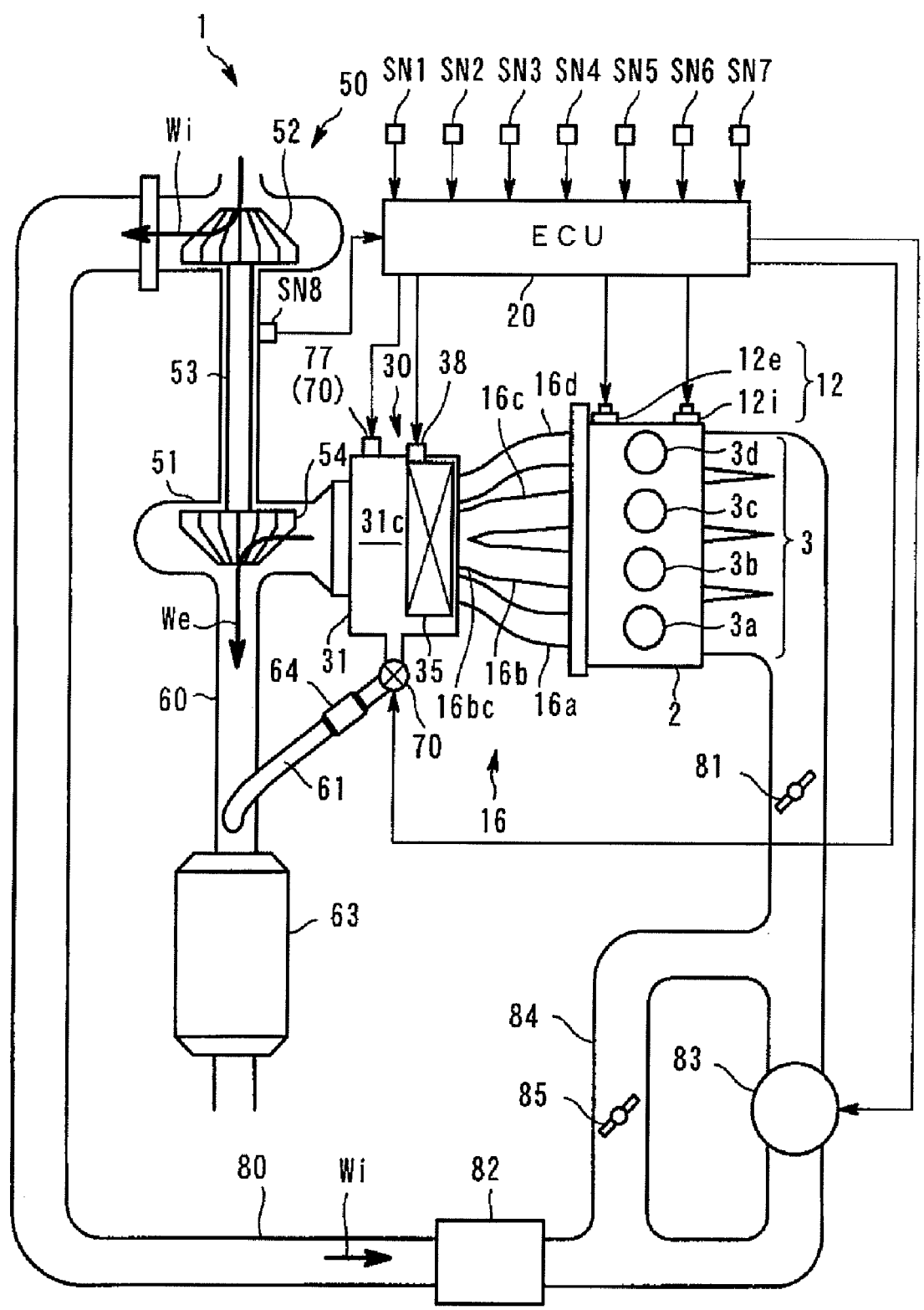
FIG. 1 is a schematic view of an engine with a supercharger according to a first embodiment of the present invention.
Figure 2:
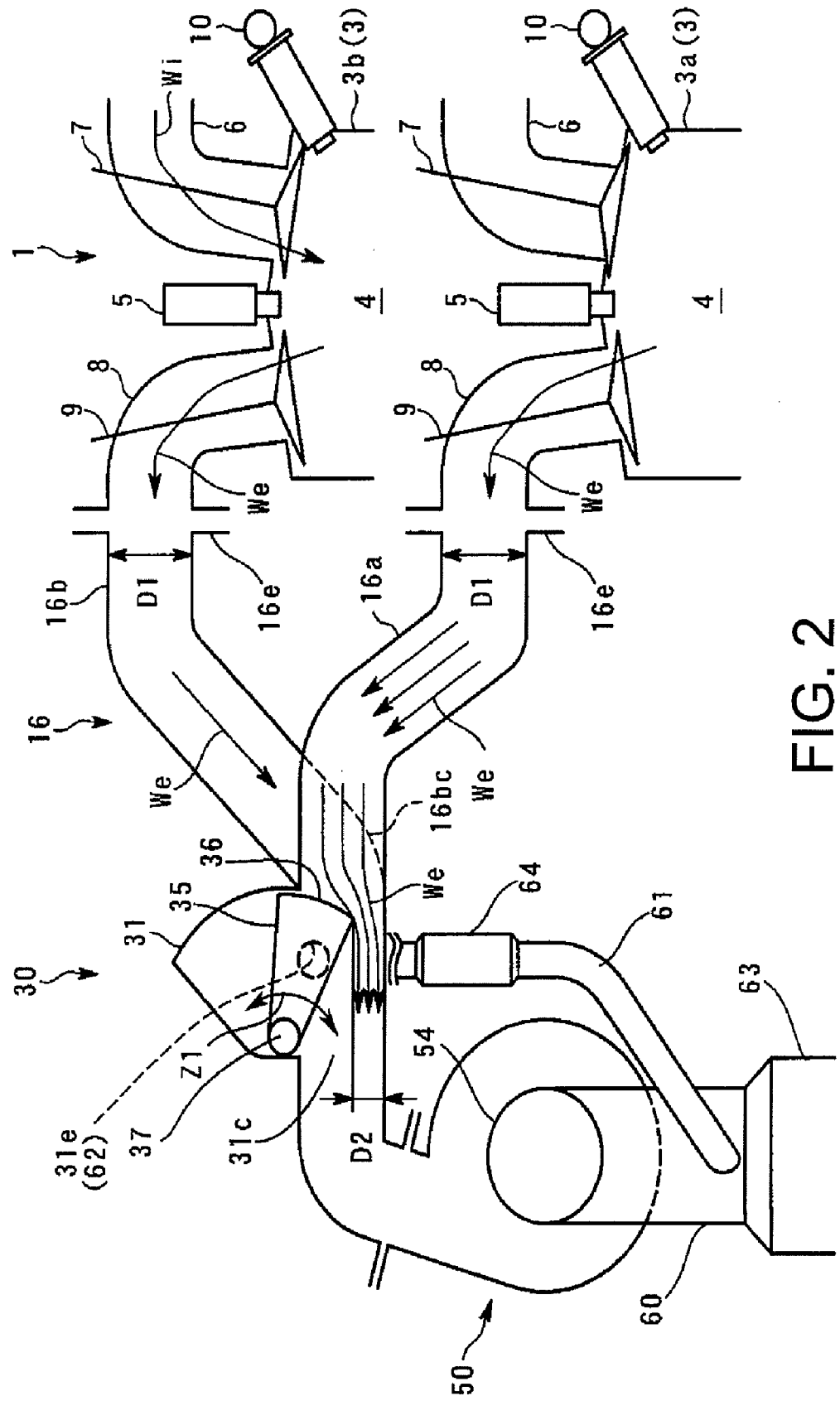
FIG. 2 is a partial side cross-section of FIG. 1.

FIG. 1 is a schematic view showing an engine system with a supercharger according to an embodiment (hereinafter, simply referred to as an "engine"). FIG. 2 is a partial side cross-section of FIG. 1.

The engine system with the supercharger is provided with an in-line four-cylinder engine 1 of four cycle.

In this embodiment, the supercharger has a simple configuration using a single turbocharger 50. The turbocharger has characteristics capable of obtaining a high supercharge performance over a wide range from a lower-speed range to a higher-speed range, and generating a high torque throughout the entire range.

To achieve this, the supercharger primarily provides the following two technical features: (1) improvement in the supercharge performance with dynamic-pressure supercharge; and (2) an independent exhaust choke control using independent exhaust passages and a variable exhaust valve 30. These features will be described in detail later, and first, a configuration and structure of the supercharger will be described.

The engine 1 includes a cylinder block 2. First through fourth cylinders 3a, 3b, 3c, and 3d (collectively referred to as "cylinders 3") are horizontally arranged in the cylinder block 2 in series. Each of the cylinders 3 of this embodiment is commonly configured, and as shown in FIG. 2, an intake port 6 through which intake air Wi is taken into a combustion chamber 4, and an exhaust port 8 thorough which exhaust gas We is discharged, are provided above the combustion chamber 4. An intake valve 7 that opens and closes the intake port 6 is provided to the intake port 6, an exhaust valve 9 that opens and closes the exhaust port 8 is provided to the exhaust port 8. A spark plug 5 is provided to the top of the combustion chamber 4 in the cylinder head (not illustrated) to generate sparks for ignition. In addition, a fuel supply mechanism (not illustrated) containing a fuel-injection valve 10 is provided to an appropriate position so as to inject fuel into the combustion chamber.

In order to detect an operating condition of the engine 1, a crank angle sensor SN1, an engine-coolant temperature sensor SN2, an airflow sensor SN3, and an intake-air temperature sensor SN4 are provided to the engine 1. In addition, in order to detect the operating condition of a vehicle that equips the engine 1, a gas-pedal opening sensor SN5, and a vehicle speed sensor SN6, are provided to the vehicle.

The engine 1 of this embodiment is operated, similar to a common four-cylinder engine, so that engine strokes are offset to each other to cause each cylinder 3 to ignite after a crank angle of 180 degrees (hereinafter, referred to as "180 degrees CA") of a previous cylinder ignition. Firing order of the cylinders is typical #1, #3, #4, and #2 in this order. The following Table 1 shows a transition in the engine stroke of each cylinder 3, and FIG. 3 shows a timing chart of the transition.

TABLE 1

| Cylinder No. | Stroke | | | |
|---|---|---|---|---|
| #1 | Expansion | Exhaust | Intake | Compression |
| #2 | Exhaust | Intake | Compression | Expansion |
| #3 | Compression | Expansion | Exhaust | Intake |
| #4 | Intake | Compression | Expansion | Exhaust |

Figure 3:
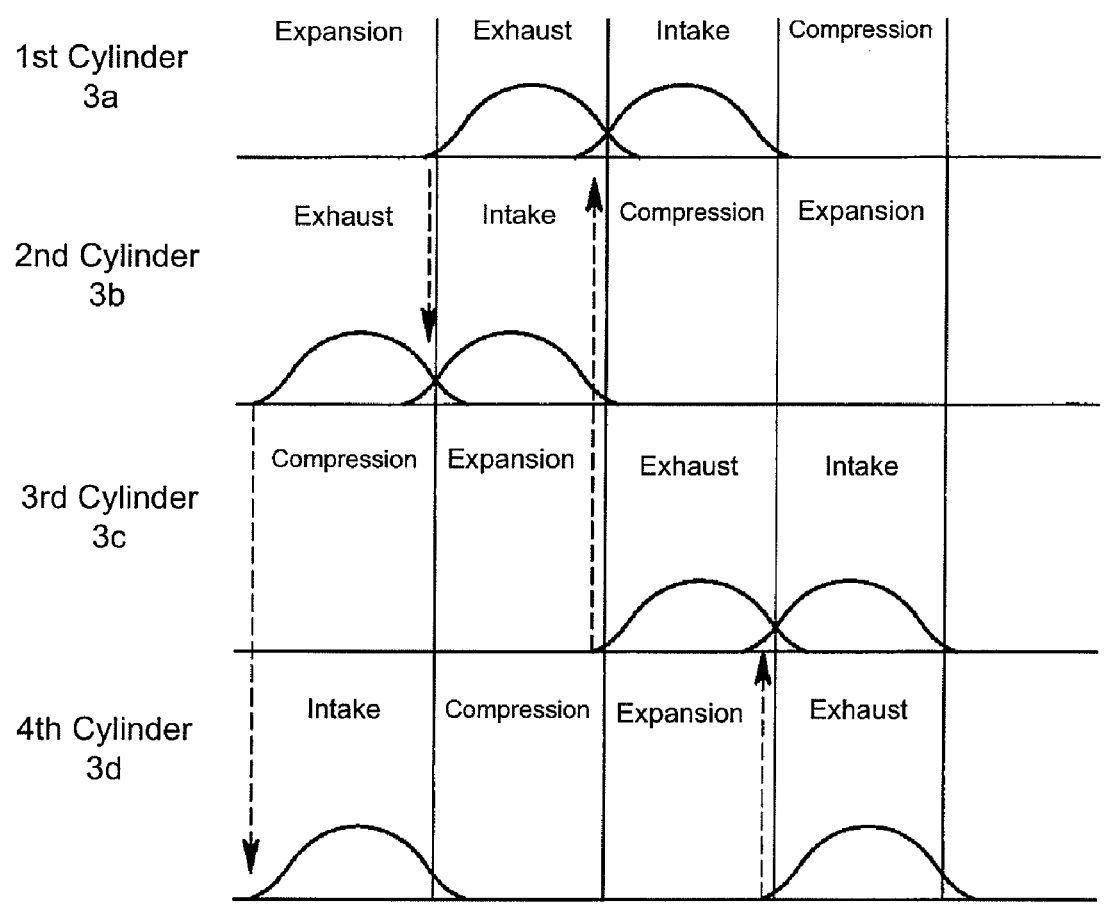
FIG. 3 is a timing chart according to the embodiment of FIG. 1.

Referring to Table 1 and FIG. 3, columns indicate the first cylinder 3a through the fourth cylinder 3d, and rows indicate a transition in the engine stroke for every 180 degree CA. As shown in Table 1, for example, when the first cylinder 3a is in an expansion stroke, the second cylinder 3b is in an exhaust stroke, the third cylinder 3c is in a compression stroke, and the fourth cylinder 3d is in an intake stroke.

In FIG. 2, a state where the first cylinder 3a is in a transition period from the expansion stroke to an exhaust stroke (in proximity to a bottom dead center) is shown. At this point, the exhaust valve 9 opens, and the exhaust gas We then begins to be discharged from the combustion chamber 4 into the exhaust port 8 (i.e., "blow down").

As shown in Table 1 and FIG. 3, when the first cylinder 3a is starting the blow down, the second cylinder 3b is in a transition period from an exhaust stroke to an intake stroke (in proximity to a top dead center). In this transition period, a period during which both of the intake valve 7 and the exhaust valve 9 are open as illustrated in FIG. 3 (that is, referred to as an "overlapped period") is provided.

As shown in FIG. 1, four independent exhaust passages 16a, 16b, 16c, and 16d that form an upstream portion of the exhaust manifold 16 are connected to the respective exhaust ports 8 of the cylinders 3.

As shown in FIG. 2, a flange 16e that is fixed to the cylinder head (not illustrated in this figure) is provided at an upstream end of each of the independent exhaust passages 16a-16d. That is, the independent exhaust passages 16a-16d are connected to the respective exhaust ports 8 of the first through the fourth cylinders 3a-3d through the flanges 16e. The independent exhaust passages 16a-16d have an opening area S1 (see FIG. 9) of the same size, and the passage cross-sectional area is the same throughout the entire length. In this embodiment, the cross-section is formed in a 36 mm-diameter circle.

Figure 4:
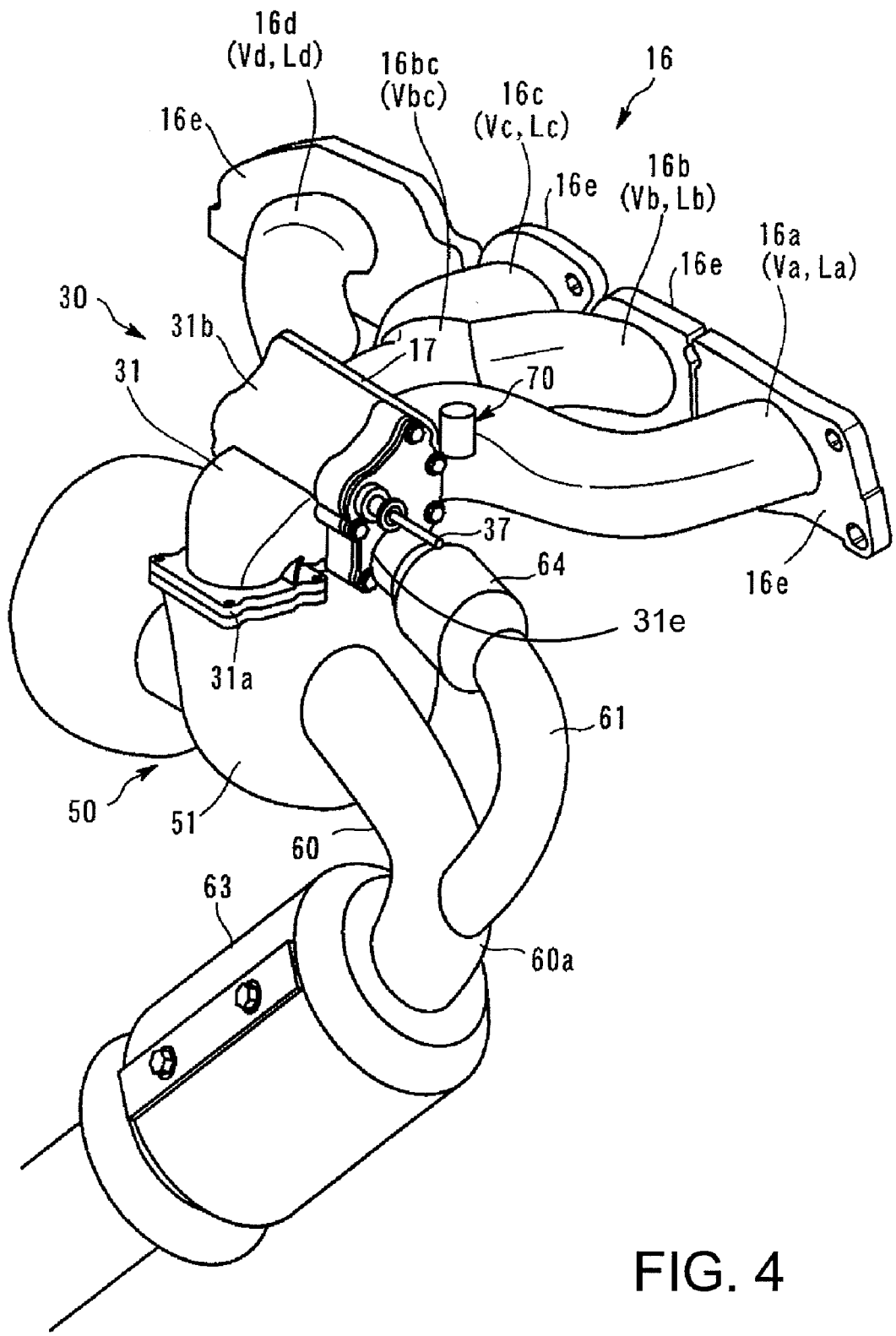
FIG. 4 is a perspective view showing a substantial part according to the embodiment of FIG. 1.
Figure 5:
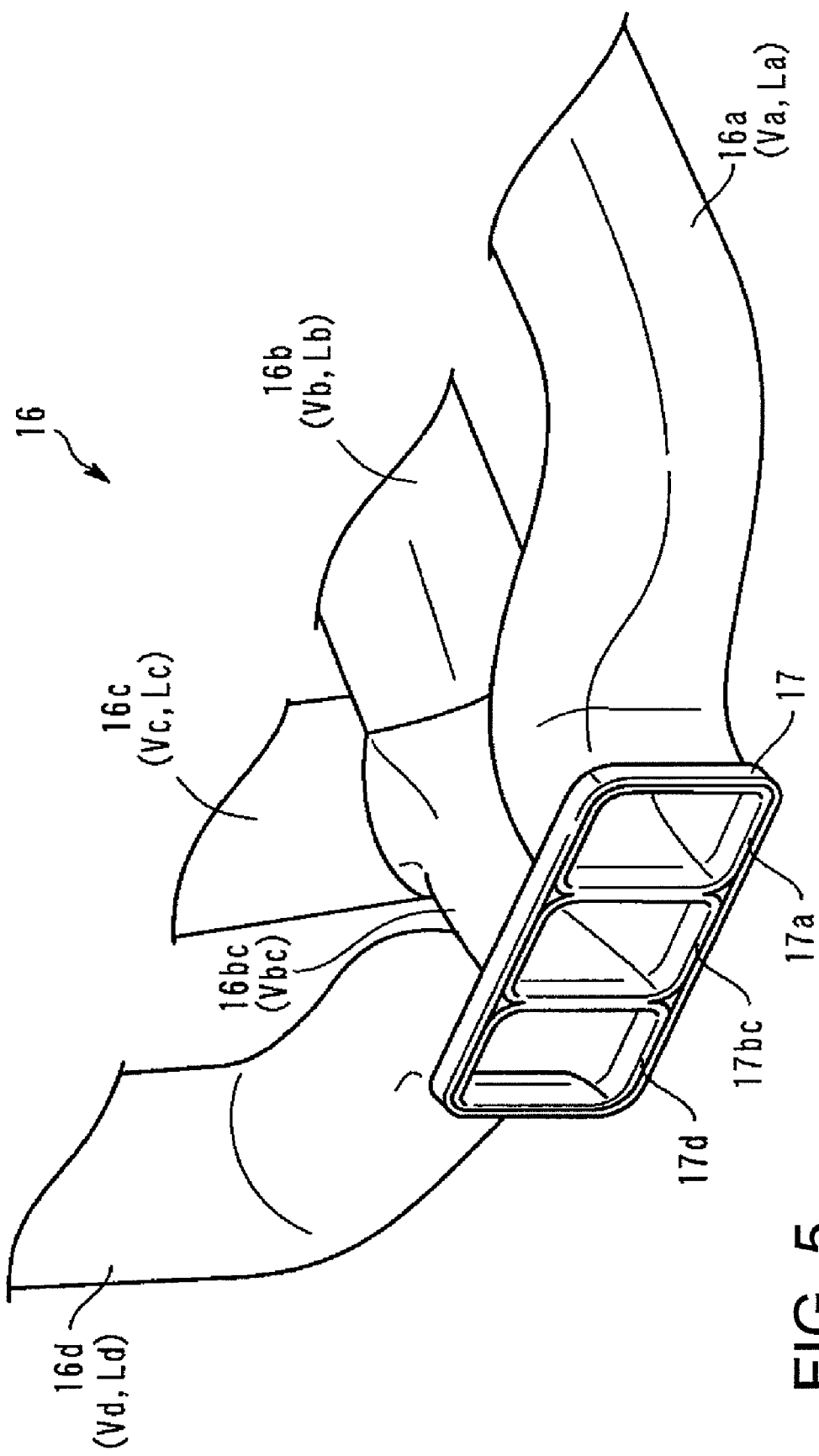
FIG. 5 is an enlarged perspective view showing a substantial part according to the embodiment of FIG. 1.

FIG. 4 is a perspective view showing a substantial portion of the exhaust system shown in FIG. 1. FIG. 5 is an enlarged perspective view showing the substantial part, illustrating a downstream end of the independent exhaust passages 16a-16d.

As shown in FIGS. 1, 4, and 5, the first exhaust passage 16a and the fourth exhaust passage 16d maintain an independent state throughout the length, while the second exhaust passage 16b and the third exhaust passage 16c are collected at an intermediate position to form an auxiliary collected exhaust passage 16bc. Thus, in this embodiment, in proximity to the downstream end of the exhaust manifold 16, three independent exhaust passages (the first exhaust passage 16a, the auxiliary collected exhaust passage 16bc, the fourth exhaust passage 16d) are formed. The first and fourth exhaust passage 16a and 16d and the auxiliary collected exhaust passage 16bc are horizontally arranged so that the first exhaust passage 16a and the fourth exhaust passage 16d sandwich the auxiliary collected exhaust passage 16bc from both left and right sides. The first exhaust passage 16a and the fourth exhaust passage 16d make a shallow angle with respect to each other (approximately parallel is preferred). As described, the first and fourth exhaust passage 16a and 16d and the auxiliary collected exhaust passage 16bc forms the exhaust manifold 16 as a whole, and hereafter, other than when particularly described, the independent exhaust passage(s) refers to the three independent exhaust passages at the downstream end.

The first exhaust passage 16a and the fourth exhaust passage 16d, and the second exhaust passage 16b and the third exhaust passage 16c have mutually symmetrical shapes, respectively. Thus, a first exhaust passage length La and a fourth exhaust passage length Ld are approximately equal. Assuming a length of the second exhaust passage 16b including a length of the auxiliary collected exhaust passage 16b c is a second exhaust passage length Lb, and a length of the third exhaust passage 16c including the length of the auxiliary collected exhaust passage 16bc is a third exhaust passage length Lc, each of the second and third exhaust passage lengths Lb and Lc are configured so that it is approximately equal to the first exhaust passage length La.

In this embodiment, the first exhaust passage length La is 200 mm or less. In addition, a first passage volume Va and a fourth passage volume Vd are approximately equal. Assuming a volume of the second exhaust passage 16b including a volume Vbc of the auxiliary collected exhaust passage 16bc is the second exhaust passage volume Vb, and a volume of the third exhaust passage 16c including the volume Vbc of the auxiliary collected exhaust passage 16bc is the third exhaust passage volume Vc, the second and third exhaust passage volumes Vb and Vc are configured so that they are approximately equal to the first exhaust passage volume Va, respectively.

As shown in FIG. 5, a fitting frame for a manifold outlet 17 is provided at the downstream end of the exhaust manifold 16, and the fitting frame of the manifold outlet 17 is sectioned into three outlets 17a, 17bc, and 17d for the independent exhaust passages 16a, 16bc, and 16d, respectively. Each of the outlets 17a, 17bc, and 17d has an opening area S1 of a 36 mm-diameter circular cross-sectional area, similar to that of each of the independent exhaust passages 16a, 16bc, and 16d.

The exhaust manifold 16 is connected to a housing 31 of the variable exhaust valve 30 through the fitting frame of the manifold outlet 17.

The variable exhaust valve 30 changes effective opening areas S2 of the outlets 17a, 17bc, and 17d while maintaining the independent states of the three independent exhaust passages 16a, 16bc, and 16d. As used herein, the term "effective opening area S2" refers to an opening area of each of the outlets 17a, 17bc, and 17d through which the exhaust gas We can flow. Hereinafter, a diameter of a circle that has an area equal to that of the effective opening area S2 is referred to as an effective opening diameter D2. The variable exhaust valve 30 is provided to improve a supercharge performance by an ejector effect which will be described later in detail. As used herein, the term "ejector effect" is to transform a part of velocity energy of a driving fluid injected from a nozzle into pressure energy, and to use the pressure energy for suction and discharge of a driven fluid. According to this ejector effect, in this embodiment, as will be described later in detail, even if the engine is operated in a relatively lower-speed and lower-load operating range, an input flow rate of the exhaust turbocharger 50 (e.g., an amount of the exhaust gas per unit time to be supplied to the exhaust turbocharger 50) can be increased. In addition, the ejector effect improves a dynamic-pressure supercharge effect or scavenging due to an increase in a peak of the blow down.

Figure 6A:
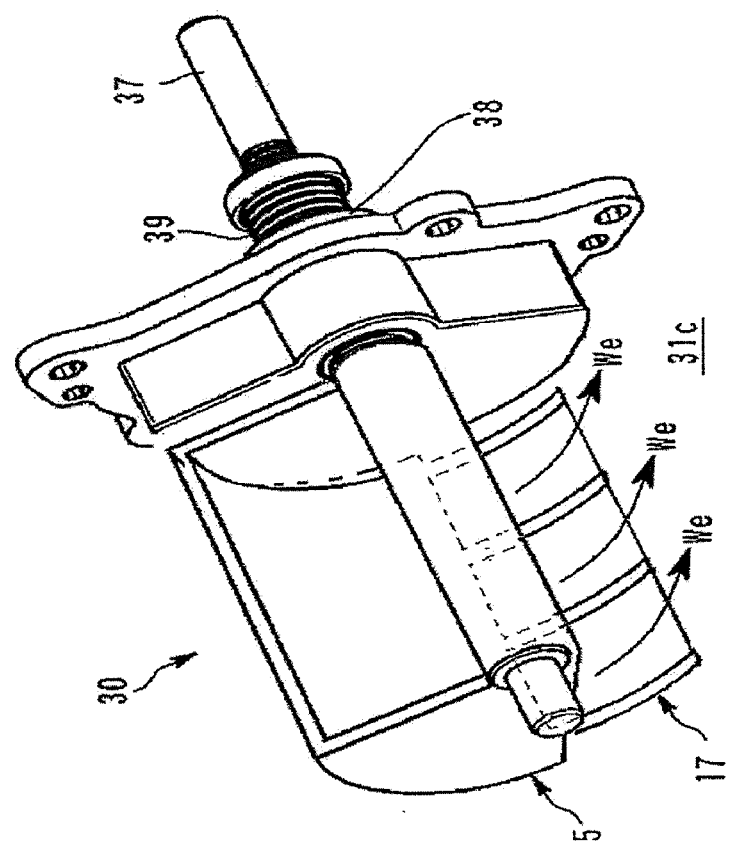
FIGS. 6A and 6B are perspective views showing a configuration of a variable exhaust valve according to the embodiment of FIG. 1, where
Figure 6B:
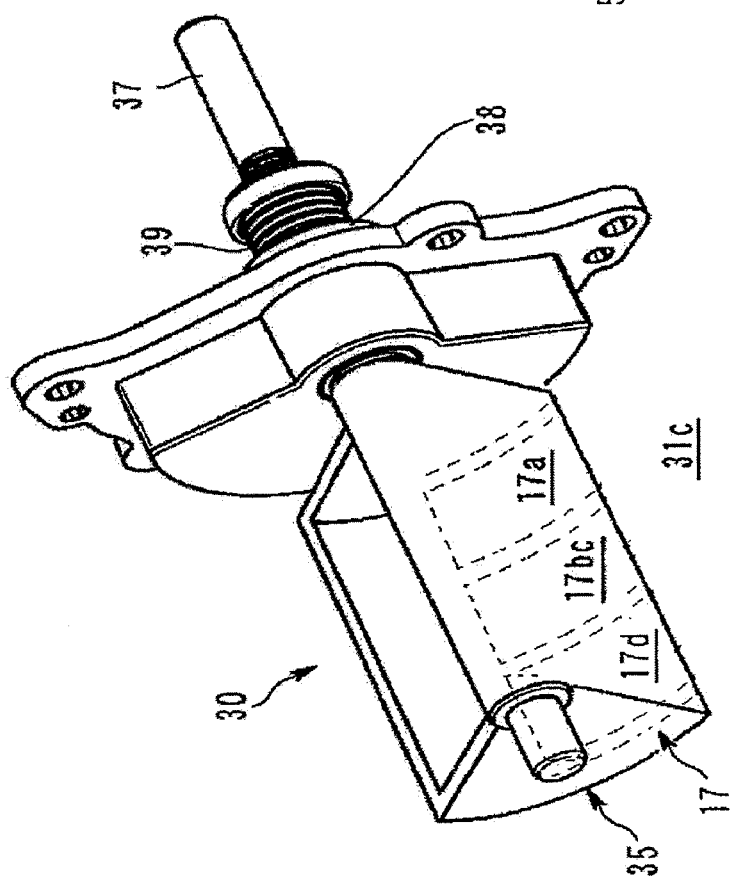

FIGS. 6A and 6B are perspective views showing a configuration of the variable exhaust valve 30 according to the embodiment of FIG. 1, where FIG. 6A shows a state when the valve is closed, and FIG. 6B shows a state when the valve is opened.

Referring to FIGS. 4, and 6A and 6B, the variable exhaust valve 30 includes a housing 31 that intervenes between the exhaust manifold 16 and the exhaust turbocharger 50, a flap 35 that is accommodated in the housing 31 and changes the effective opening areas S2 of the outlets 17a, 17bc, and 17d of the exhaust manifold 16, a flap shaft 37 pivotally supported by the housing 31 so that the flap 35 swings about an axis intersecting a direction to which the exhaust gas We flows, an actuator 38 (e.g., a motor) that rotates the flap shaft 37, and a return spring 39 that biases the flap 35 to a valve-opening direction through the flap shaft 37.

The fitting frame of the manifold outlet 17 is fixed at the upstream end of the housing 31. Thus, the outlets 17a, 17d, and 17bc of the first independent exhaust passage 16a, the fourth independent exhaust passage 16d, and the auxiliary collected exhaust passage 16bc of the exhaust manifold 16 are connected to the housing 31 so that they are arranged in parallel.

A flange 31a is provided at a downstream end of the housing 31, and the housing 31 is coupled to a housing 51 of the exhaust turbocharger 50 through the flange 31a. The housing 31 is bent downwardly at the middle, suitable for a layout of the exhaust turbocharger 50. Such a bend may not be necessary depending on the installed position of the exhaust turbocharger 50. Further, the bend may be at a different angle.

A collective portion 31c at which the exhaust gases We from the independent exhaust passages 16a, 16bc, and 16d are collected is formed upstream of the flange 31a inside the housing 31. A bulged portion 31b is provided upstream of the collective portion 31c, that bulges upward perpendicular to the mainstream of the exhaust gas We flowing inside the housing 31. The flap 35 is accommodated inside the bulged portion 31b so that it advances from or retreats into the bulged portion 31b by rotating about the center axis of the flap shaft 37.

Referring to FIG. 6, the flap 35 is formed hollow inside to reduce weight, and has a sectorial surface 36 (see, e.g., FIG. 7A) around the flap shaft 37. When the flap 35 rotates so as to project downwardly from the bulged portion 31b, the sectorial surface opposes the outlets 17a, 17bc, and 17d of the exhaust manifold 16 connected to the housing 31 such that the flap 35 regulates a flow rate of the exhaust gas We discharged from the exhaust manifold 16 (refer to FIG. 6A). On the other hand, if the flap 35 rotates to a position where the flap 35 enters into the bulged portion 31b, the sectorial surface 36 opens the outlets 17a, 17bc, and 17d (refer to FIG. 6B).

In this embodiment, even when the variable exhaust valve 30 is located at a fully closed position, a small amount of the exhaust gas We can flow through the variable exhaust valve 30 into the collective portion 31c (for example, approximately 20% of the entire exhaust gas flow).

Here, advantages of the flap 35 of the variable exhaust valve 30 being in the shape having the sectorial surface 36 (hereinafter, referred to as a "sectorial shape") will be described.

Figure 7A:
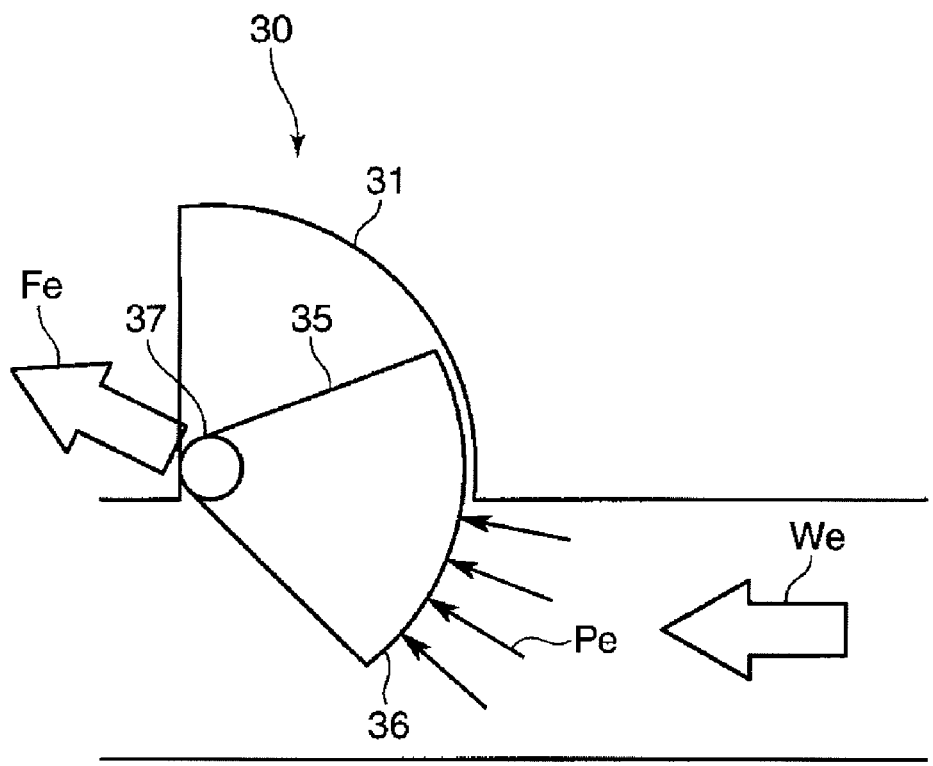
FIGS. 7A and 7B are views showing fluid forces which act on a flap of the variable exhaust valve, where
Figure 7B:
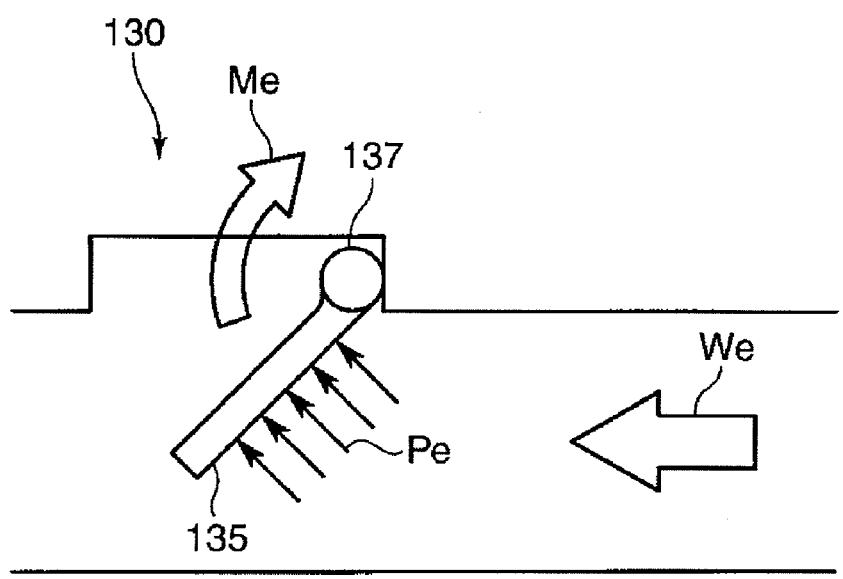

FIGS. 7A and 7B are views showing fluid forces that act on the flap of the variable exhaust valve, where FIG. 7A is a case when the sector-shaped flap 35 as described in this embodiment is used, and FIG. 7B is a case where a common plate-like flap 135 is used, in order to compare with the configuration of this embodiment of FIG. 7A.

First, referring to FIG. 7B, a common variable exhaust valve 130 having the plate-like flap 135 will be described. The variable exhaust valve 130 has the plate-like flap 135, and one side of the plate-like flap is swingably supported by a flap shaft 137. This is a common flap structure used to choke the fluid passage.

In this case, when the exhaust gas We hits the plate-like flap 135, a fluid force of the exhaust gas (e.g., an exhaust pressure Pe) acts perpendicular to a plate surface of the plate-like flap 135. As a result, a rotational moment Me occurs to the plate-like flap 135 around the flap shaft 137. When pulsations of the exhaust gas We are large, the rotational moment Me significantly varies in accordance with the pulsations. Especially in this embodiment, because the pulsations of the exhaust gas We are considered to be large in order to perform the dynamic-pressure supercharge (described later in detail), the variation in the rotational moment Me, affected by the pulsating amplitude, also becomes large.

As the variation in the rotational moment Me is large, fluttering of the plate-like flap 135 easily occurs and its operation will be unstable and, thus, a mechanism to prevent this may be needed. For example, it may be necessary to enlarge the actuator 38 or the return spring 39 so that it can be applied with a higher load.

Referring next to FIG. 7A, the variable exhaust valve 30 of this embodiment will be described. Also in this case, the exhaust pressure Pe similarly acts on the sectorial surface 36 of the flap 35. However, because the exhaust pressure Pe perpendicularly acts on the sectorial surface 36 (i.e., in the radial direction of the flap shaft 37), theoretically, the rotational moment Me does not occur. That is, a radial load Fe acts on the flap shaft 37 as a resultant force. Therefore, even when the exhaust pulsations are large, fluttering of the flap 35 does not easily occur. Therefore, it is not necessary to enlarge the actuator 38 or to equip the return spring 39 to prevent the fluttering. As a result, the variable exhaust valve 30 of this embodiment can be reduced in size while its operation becomes more reliable, comparing with the conventional configuration described above.

In this embodiment, the sectorial surface 36 substantially adjusts the effective opening areas S2 of the outlets 17a, 17bc, and 17d located upstream of the flap shaft 37 for the mainstream of the exhaust gas We. The flap shaft 37 horizontally arranged may preferably be located close to the collective portion 31c as much as possible. Therefore, a torque around the flap shaft 37 that acts on the flap 35 when the exhaust gas We contacts the sectorial surface 36 will be smaller compared with a configuration equipped with a plate-like vane for interrupting the exhaust gas flow located upstream of its rotational shaft (this configuration is not illustrated). Therefore, the configuration of this embodiment may not readily be vibrated by the blow down even in an operating condition where the exhaust flow velocity Qe is large.

Referring to FIG. 2, a waste gate opening 31e is formed on a side face of the bulged portion 31b of the housing 31. The waste gate opening 31e communicates with the outlets 17a, 17bc, and 17d in the operating range of the flap 35 from a predetermined closed position shown in FIG. 6B to a fully open position. The opening and closing of the waste gate opening 31e is controlled by a waste gate valve mechanism (not illustrated) formed in the side face of the housing 31.

An exhaust passage 60 is provided with a waste passage 61 that bypasses a turbine 54, and a waste gate valve 62 that opens and closes the waste passage 61 which begins to open at an intercept point.

As shown in FIGS. 1, 2, and 4, the waste gate opening 31e bypasses the exhaust turbocharger 50 through the discharge passage 61, and is connected to the main exhaust passage 60 upstream of the catalyst 63. More specifically, in this embodiment, the catalyst 63 is arranged directly below the exhaust turbocharger 50, and the main exhaust passage 60 connected to the exhaust turbocharger 50 forms a bent portion 60a (FIG. 4) between the exhaust turbocharger 50 and the catalyst 63. A downstream end of the discharge passage 61 as a waste gate passage is connected to the main exhaust passage 60 by connecting the downstream end of the discharge passage 61 to a perimeter of the bent portion 60a. In this embodiment, a cooler 64 is provided in the discharge passage 61. In this embodiment, an exhaust temperature sensor SN7 is provided at an appropriate location to detect a temperature condition of the catalyst 63 based on a temperature of the exhaust gas We. In this embodiment, the catalyst 63 is a three-way catalytic converter (TWC). The three-way catalytic converter efficiently removes hydrocarbon, carbon monoxide, and nitrogen oxide contained in the exhaust gas from the engine, and typically, its active temperature is 200 degrees C. to 250 degrees C.

Next, the exhaust turbocharger 50 is connected to a downstream end of the housing 31 of the variable exhaust valve 30 (i.e., at the collective portion 31c). As shown also in FIG. 1, the exhaust turbocharger 50 includes the housing 51 connected between the variable exhaust valve 30 and the main exhaust passage 60 for leading the exhaust gas We from the exhaust manifold 16 to the main exhaust passage 60, a turbine scroll 54 arranged inside the housing 51 at the upstream end of the main exhaust passage 60, a compressor scroll 52 provided in the intake passage 80, and a shaft 53 coupled with the compressor scroll 52. The exhaust turbocharger 50 drives the compressor scroll 52 by rotating the turbine scroll 54 with the exhaust gas We to compress the intake air Wi to increase the air-intake pressure. The exhaust turbocharger 50 of this embodiment is primarily a large-sized turbo that is powerful in its capacity for torque increase, within a higher-speed operating range.

In this embodiment, a rotational speed sensor SN8 is provided for detecting a rotational speed of the exhaust turbocharger 50 (refer to FIG. 1).

A throttle valve 81 is provided in the intake passage 80 of the engine 1, and an air-intake flow rate is adjusted by the throttle valve 81.

An intercooler 82 is arranged between the throttle valve 81 and the compressor scroll 52 of the exhaust turbocharger 50, and an electric supercharger 83 is provided between the intercooler 82 and the throttle valve 81. The electric supercharger 83 includes an impeller that is directly driven by an electric motor. A bypass passage 84 is provided to the intake passage 80 to bypass the electric supercharger 83 to communicate a downstream portion of the intercooler 82 with an upstream portion of the throttle valve 81. An intake control valve 85 is provided in the bypass passage 84. The intake control valve 85 is driven by an actuator (not illustrated) to adjust an airflow volume inside the bypass passage 84.

As shown in FIG. 1, a variable valve timing mechanism 12 is provided to the engine 1. The variable valve timing mechanism 12 of this embodiment is a VVT (Variable Valve Timing) that moves valve-open and/or valve-close timing back and forth while maintaining valve-open periods of the intake valve 7 and the exhaust valve 9. The variable valve timing mechanism may be a type in which a valve timing is continuously changed, or the valve timing is changed in a stepwise fashion.

The variable valve timing mechanism or VVT 12 includes an intake VVT 12i on the intake side (e.g., an intake valve timing change module), and an exhaust VVT 12e on the exhaust side (e.g., an exhaust valve timing change module). In this embodiment, VVT 12 changes the valve timings of both of the intake valve 7 and the exhaust valve 9.

Operation of the engine 1 is electrically controlled by an engine control unit (ECU) 20. ECU 20 is a control unit typically including a microprocessor having a CPU, a memory, a counter timer group, an interface, and a bus that connects these components.

As shown in FIG. 1, ECU 20 is connected with various detection modules as input elements, such as a crank angle sensor SN1, an engine-coolant temperature sensor SN2, an airflow sensor SN3, intake-air temperature sensor SN4, gas-pedal opening sensor SN5, vehicle speed sensor SN6, an exhaust temperature sensor SN7, and a rotational speed sensor SN8. On the output end, ECU 20 is connected with, as control elements, a fuel supply mechanism (not illustrated) including a fuel-injection valve 10, an actuator (not illustrated) of the throttle valve 81, an electromagnetic valve (not illustrated) provided to VVT 12, an actuator 38 of the variable exhaust valve 30, an electric supercharger 83, and an intake control valve 85 of an actuator (not illustrated), etc.

With this configuration, ECU 20 functions as a combustion control module that performs a combustion control, such as controls of an amount of fuel supply, a throttle opening, an ignition timing, etc. ECU 20 as the combustion control module also performs a drive control of VVT 12. ECU 20 also functions as a variable exhaust valve control module that carries out a drive control of the variable exhaust valve 30.

More specifically, ECU 20 performs an independent exhaust choke control in which passage cross-sectional areas of the independent exhaust passages 16a, 16bc, and 16d are reduced by the variable exhaust valve 30 below the maximum area (when the variable exhaust valve 30 is in a valve-open condition) in a predetermined lower-speed range of at least the supercharging range (in a speed range that is lower than the intercept point at which the waste gate valve 62 begins to open).

Figure 8:
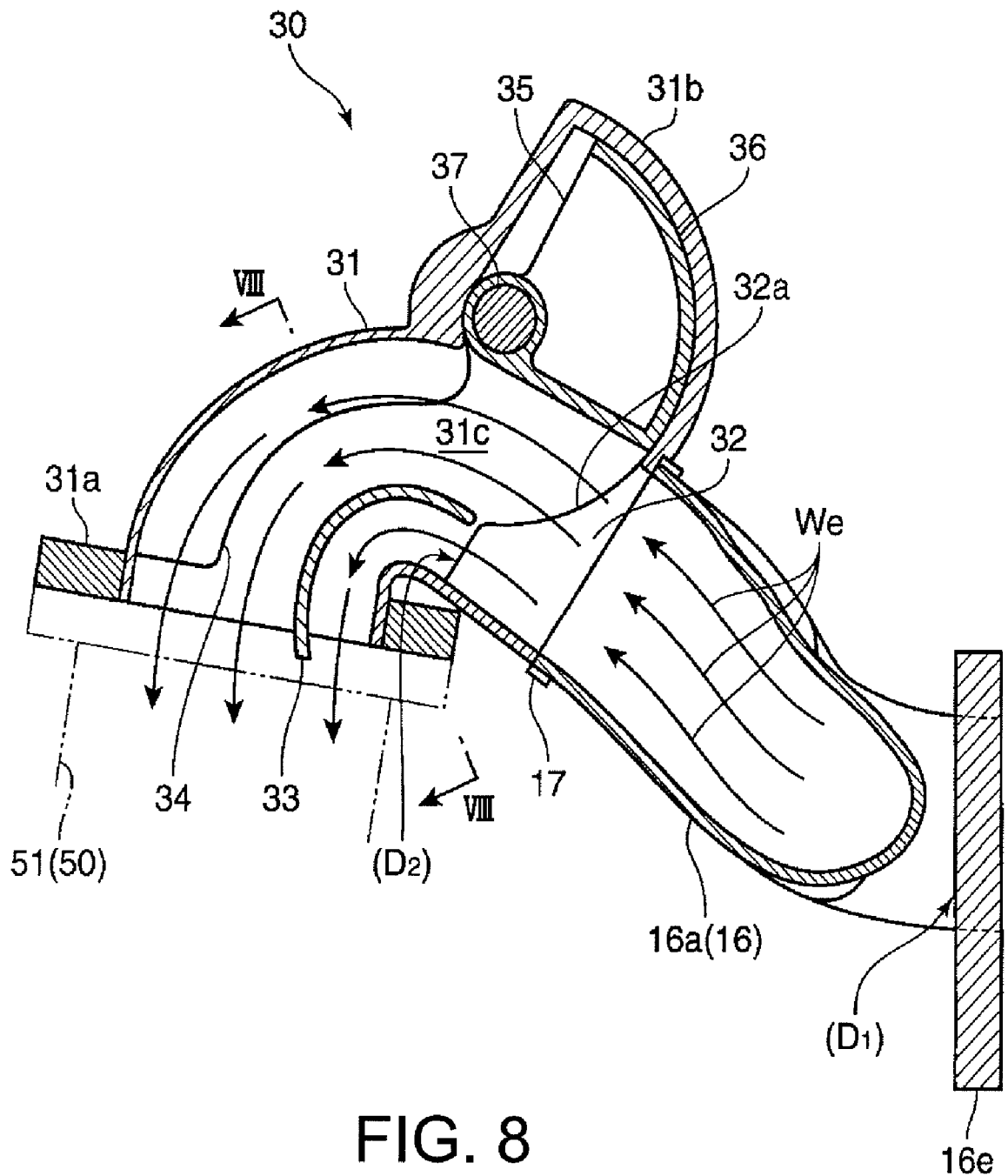
FIG. 8 is a longitudinal cross-portion of a housing of an exhaust manifold and the variable exhaust valve, and shows a state when the variable exhaust valve is open.

Here, an example of the structure of the variable exhaust valve 30 will be described in detail referring to FIGS. 8-10. As shown in FIG. 8, the housing 31 is connected to the manifold outlet 17 of the exhaust manifold 16. The housing 31 functions as a valve housing that supports and accommodates the flap 35 of the variable exhaust valve 30 in an upstream-side portion thereof and, thus, it forms a collective portion 31c into which the exhaust gases We from the independent exhaust passages 16a, 16bc, and 16d join together in a downstream-side portion.

Still referring to FIG. 8, the bulged portion 31b that bulges upwardly is provided to the housing 31. Here, a state where the flap 35 is accommodated inside the bulged portion 31b is a valve-open state (e.g., fully open) of the variable exhaust valve 30. When the variable exhaust valve 30 is fully open, the exhaust gas We introduced into the housing 31 from the manifold outlet 17 is led to the collective portion 31c without being choked by the flap 35 (e.g., the variable exhaust valve 30).

Figure 9:
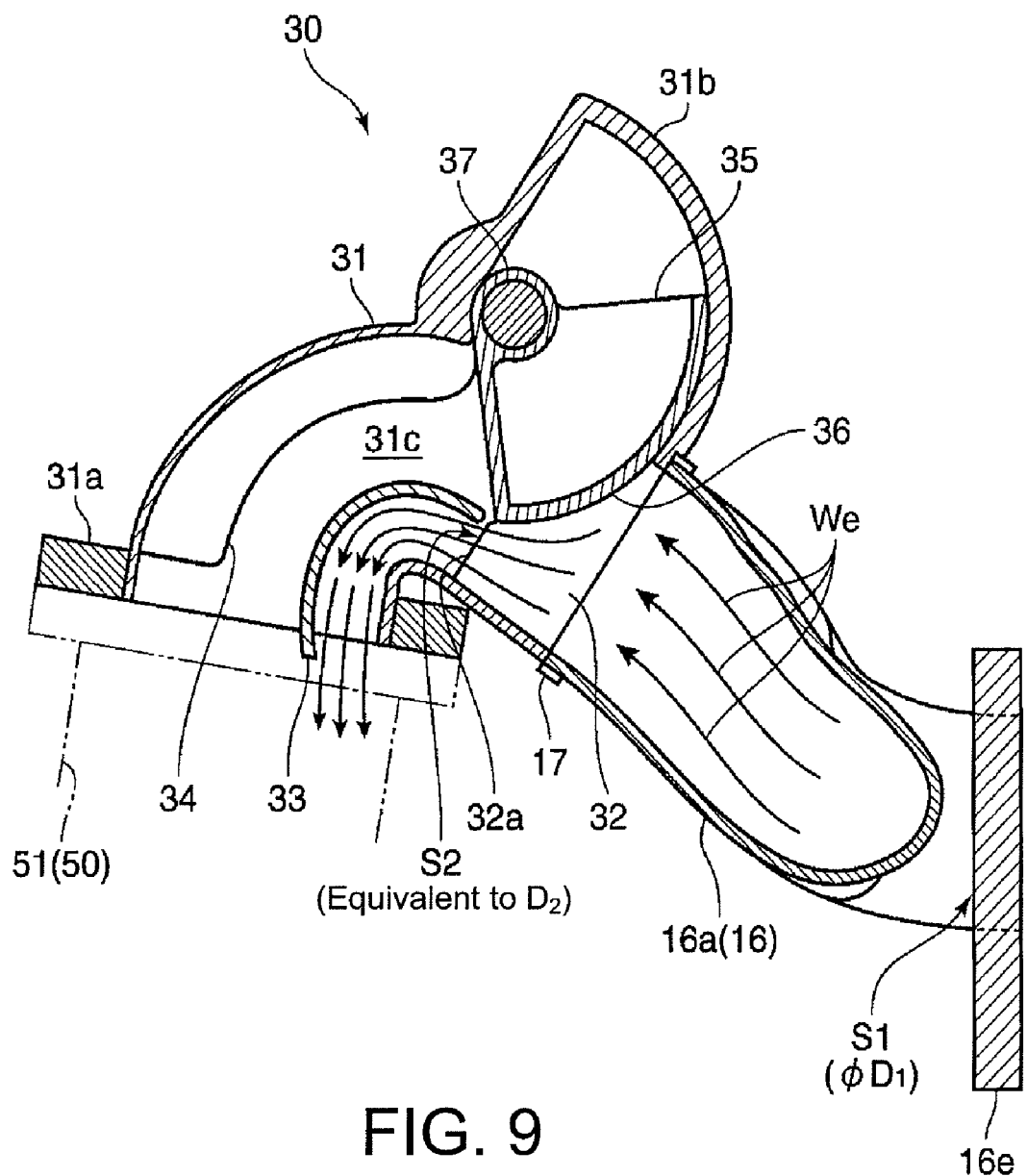
FIG. 9 is a cross-sectional view similar to that of FIG. 8, and shows a state when the variable exhaust valve is closed.

On the other hand, as shown in FIG. 9, a state where the flap 35 is rotated downwardly about the flap shaft 37 and most of the flap is not in the bulged portion 31b, is referred to as a valve-closed state of the variable exhaust valve 30 (e.g., fully closed). The flap opening is appropriately controlled by the actuator 38 between the fully-closed state and the fully-open state.

When the variable exhaust valve 30 is fully closed as shown in FIG. 9, because the sectorial surface 36 of the flap 35 interrupts a part of the flow passage, the exhaust passage cross-sectional area is thus reduced. Therefore, the exhaust gas We introduced into the housing 31 from the manifold outlet 17 is choked by the variable exhaust valve 30, and then, is led to the collective portion 31c.

As shown in FIGS. 8 and 9, two divider plates 32 are provided at an upstream position in the housing 31. The divider plates 32 are provided in parallel with the flow of the exhaust gas We and are spaced in the axial direction of the flap shaft 37. One of the divider plates 32 divides a space inside the housing 31, and it is formed continuously from a wall between the first opening 17a and the auxiliary collected opening 17bc at the manifold outlet 17. The other divider plate 32 similarly divides the remaining space inside the housing 31, and it also is formed continuously from a wall between the auxiliary collected opening 17bc and the fourth opening 17d. That is, in the divided passage sections through which the exhaust gases We flow along the respective divider plates 32, the independent exhaust passages 16a, 16bc, the 16d are maintained their independent state and parallel state by the divider plates 32.

A trailing edge 32a of each of the divider plates 32 is formed in a shape so as to follow the sectorial surface 36 of the flap 35 when the variable exhaust valve 30 is in the valve-closed state. Therefore, when the exhaust gas We is choked by the flap 35, it is choked while the above-described independent state and parallel state are maintained.

The collective portion 31c is formed downstream of the trailing edges 32a of the divider plates 32.

A flange 31a is provided at the downstream end of the housing 31, and it is coupled to the housing 51 of the turbocharger 50. The housing 31 is bent downwardly at its intermediate position due to an arrangement of the turbocharger 50, as described above. Such curve may be unnecessary depending on the installed position of the turbocharger 50. Further, the curve may be made at a different angle.

Figure 10:
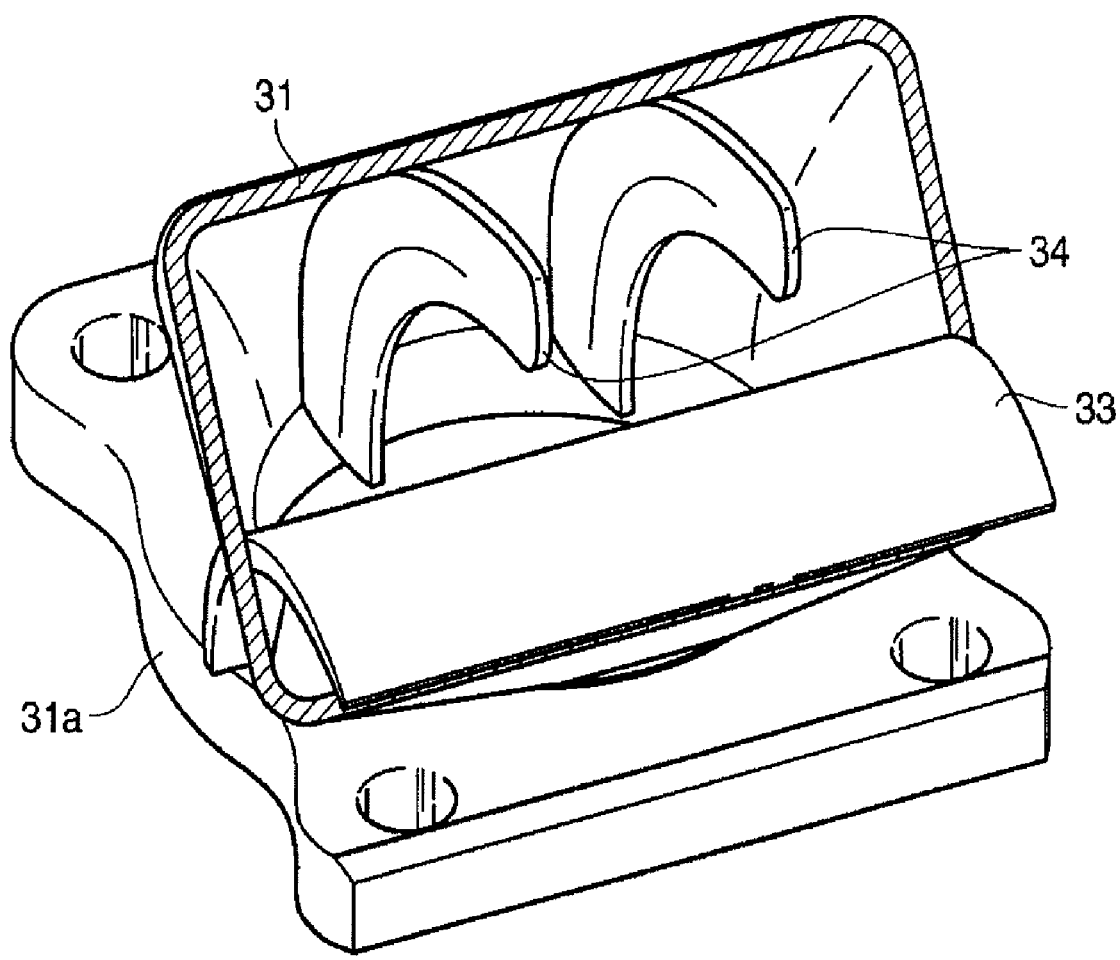
FIG. 10 is a cross-sectional view taken along a line of VIII-VIII in FIG. 8.

Still referring to FIGS. 8-10, a flow-guide plate 33 is provided inside the housing 31 in a shape so as to follow the curve of the housing 31. The flow-guide plate 33 guides the exhaust gas We that passed the divider plates 32 so that the exhaust gas smoothly flows along the curve of the housing 31. More specifically, as shown in FIG. 9, the flow-guide plate 33 narrows the channel inside the housing 31 through which the exhaust gas flows by surrounding the exhaust gas We past the divider plates 32 with an inner-curve surface of the housing 31 and the flow-guide plate 33 when the variable exhaust valve 30 is in the valve-closed state.

Two fairing guides 34 are provided inside the collective portion 31c of the housing 31 so that they inwardly protrude from an outside curve surface of the housing 31. The fairing guides 34 are provided along the flow of the exhaust gas We (i.e., in parallel with the exhaust gas flow), and are spaced in the axial direction of the flap shaft 37. The fairing guides 34 are located along approximately the same planes as the respective divider plates 32. A gap is provided between the fairing guides 34 and the flow-guide plate 33. Although described in detail later, the fairing guides 34 are provided to regulate a circling flow in a direction intersecting the exhaust-flow direction, the direction that is not parallel with the paper surface of FIG. 8 or FIG. 9.

Next, the substantial technical features of this embodiment introduced at the beginning herein will be described in detail.

(1) Improvement of Supercharge Performance by Dynamic-Pressure Supercharge

First, the dynamic-pressure supercharge will be described. The dynamic-pressure supercharger improves the supercharge performance of the turbocharger 50 using pulsations of the exhaust gas, as described below.

Figure 11:
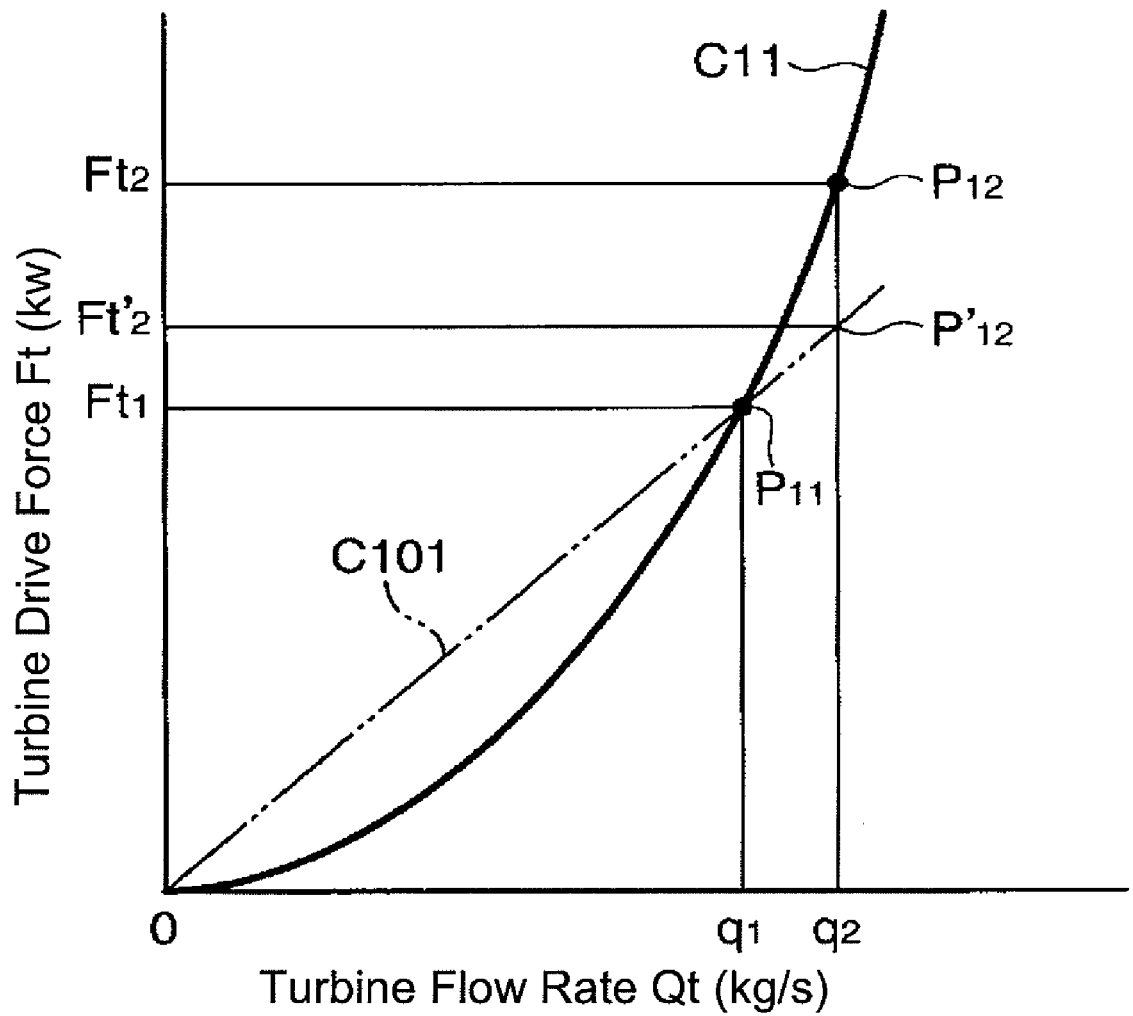
FIG. 11 is a turbine characteristic plot for a turbocharger.

FIG. 11 is a turbine characteristic plot of the turbocharger 50. The horizontal axis represents a turbine flow rate Qt (kg/s), and the vertical axis represents a turbine drive force Ft (kW). Normally, the pulsations occur also in the turbine flow rate Qt due to the exhaust-gas pulsations. However, the turbine flow rate Qt and the turbine drive force Ft illustrated herein are an instant flow rate and an instant drive force that change in accordance with the pulsations, respectively. The principle of the dynamic-pressure supercharge will be described below referring to FIG. 11.

As shown by the characteristic C11, the turbine drive force Ft increases as the turbine flow rate Qt increases. A rate of the increase is not constant (nonlinear), and the rate increases as the turbine flow rate Qt increases. As a result, the characteristic C11 is a downwardly convex characteristic as illustrated. In FIG. 11, a degree of the curve is exaggerated more so than the actual curve, for clarity of explanation.

The characteristic C101 is a virtual characteristic shown for comparison with the characteristic C11, and is a characteristic having a proportionally linear relationship between the turbine flow rate Qt and the turbine drive force Ft.

Here, a case where pulsations of the turbine flow rate Qt are small (a peak flow rate is q1 in FIG. 12), and a case where these are large (a peak flow rate is q2 in FIG. 12) are considered. For both cases, it is assumed that turbine flow rates that are averaged by time (for example, per 180 degree CA) are the same. In these cases, an effective exhaust time per one exhaust stroke (hereinafter, referred to as a "blow down period") is shorter when the pulsations of the turbine flow rate Qt is large, compared with that of small pulsations (refer to FIG. 12).

First, referring to FIG. 11, the linear characteristic C101 will be described. When pulsations of the turbine flow rate Qt are small and the peak value is the flow rate q1, a pulsation peak value of the turbine drive force Ft is a drive force Ft1 (at a point P11). On the other hand, when pulsations of the turbine flow rate Qt is large and its peak value is a flow rate q2, a pulsation peak value of the turbine drive force Ft is a drive force Ft2' (at a point P12'). Thus, it can been seen as if the average value of the turbine drive force Ft apparently increased when pulsations of the turbine flow rate Qt is larger, compared with a case where the flow rate is smaller. However, because the blow down period becomes shorter so as to cancel the influence, the time-averaged turbine drive forces are theoretically the same. It may be appreciated that this is the same when there is no pulsation with a steady flow.

On the other hand, in the case of an actual characteristic C11, it will be as follows. When pulsations of the turbine flow rate Qt is small, it will be the same as that of the characteristic C101 (at a point P11). However, when pulsations of the turbine flow rate Qt is large and the peak value is a flow rate q2, the pulsation peak value of the turbine drive force Ft becomes a drive force Ft2 (at a point P12). Because the drive force Ft2>the drive force Ft2' as shown in FIG. 11, in this case, even if the deduction is considered due to shortening of the blow down period for the case where pulsations of the turbine flow rate Qt is larger, the time-averaged turbine drive force increases, compared with the case where the turbine flow rate is smaller.

As described above, because the turbocharger 50 has the downwardly-convex turbine drive force characteristic similar to the characteristic C11, the time-averaged value of the turbine drive force increases as pulsations of the turbine flow rate Qt increases, thereby increasing the supercharge pressure. This is a principle of the dynamic-pressure supercharge.

Figure 12:
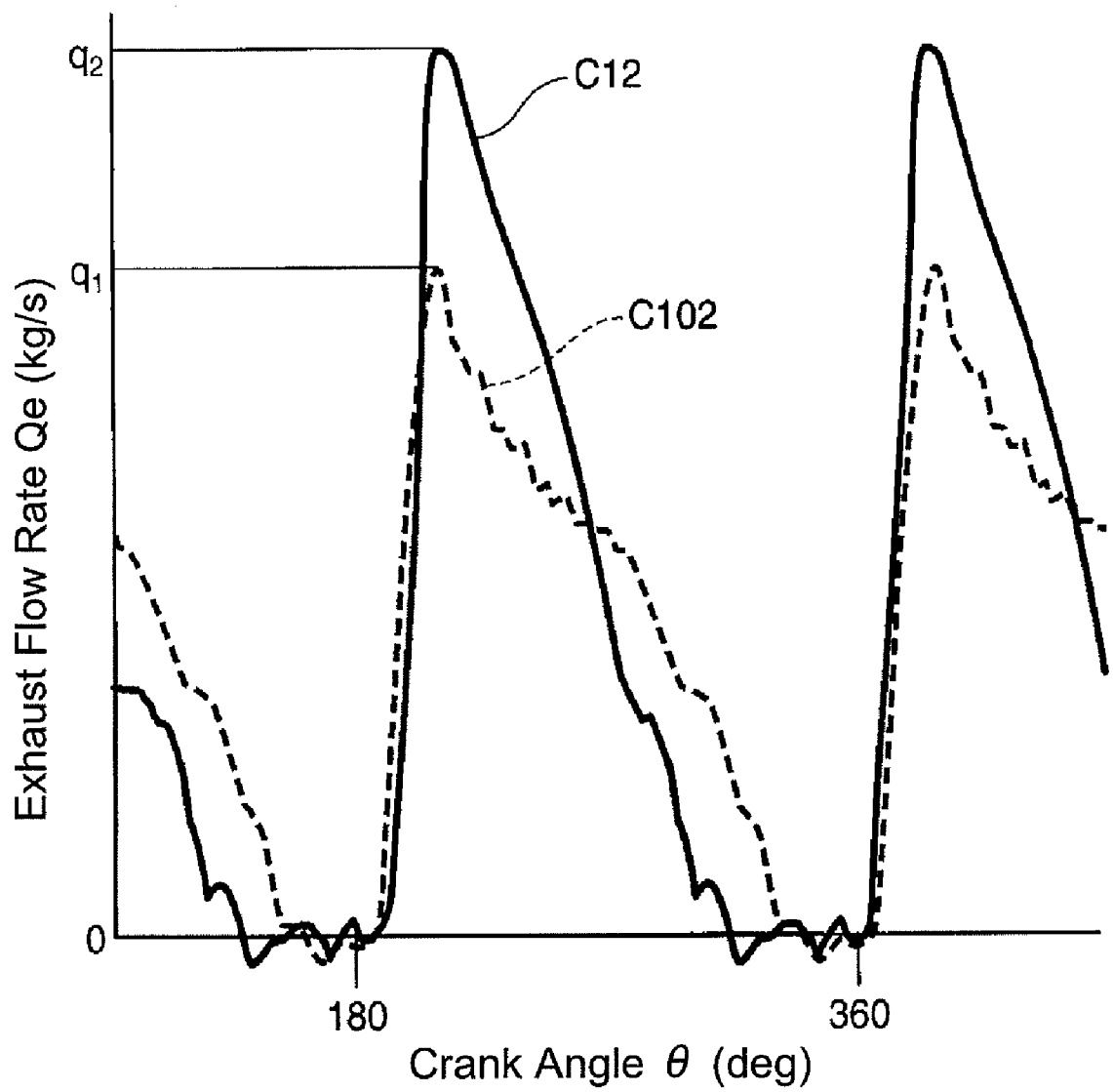
FIG. 12 is a plot of the exhaust pulsating characteristic.

FIG. 12 is a plot of the exhaust pulsating characteristic (actual measurement). The horizontal axis represents a crank angle θ of the first cylinder 3a, where a 0 degree CA is a top dead center, and the vertical axis represents an exhaust flow rate Qe (kg/s). The illustrated characteristic is such that there is no choking effect by the variable exhaust valve 30 (e.g., when the variable exhaust valve 30 is fully open). The exhaust flow rate Qe is the sum total of all of the cylinders 3. Therefore, the blow down occurs at a 180 degree CA cycle in any of the cylinders. In the illustrated example, the blow down occurs in the first cylinder 3a from 180 degrees CA to 360 degrees CA. When the waste gate valve 62 is closed, the exhaust flow rate Qe becomes equal to the turbine flow rate Qt (FIG. 11).

The characteristic C12 is a characteristic of this embodiment, and its pulsation peak value corresponds to a flow rate q2 (corresponding to the flow rate q2 of FIG. 11), that is, it is a characteristic with large exhaust pulsations. On the other hand, the characteristic C102 is shown to compare with the characteristic C12, and its pulsation peak value corresponds to a flow rate q1 (corresponding to the flow rate q1 of FIG. 11), that is, it is a characteristic with small exhaust pulsations. The characteristic C12 has exhaust pulsations larger than that of the characteristic C102, and the blow down period is accordingly shorter. That is, the characteristic C12 has a higher dynamic-pressure supercharge effect than that of the characteristic C102. Specifically, for the characteristic C12, the turbine rotational speed, an actual measurement, increased 43% compared with the characteristic C102.

Because the blow down period is shortened by performing a powerful dynamic-pressure supercharge, the exhaust pressure after the blow down decreases, while an exhaust resistance decreases and residual gas is reduced, as well as having effects in improvement of the filling amount of air intake and anti-knock performances.

The most effective scheme for obtaining large exhaust pulsations similar to the characteristic C12 is to reduce a volume of the exhaust manifold 16. To do so, the first passage volume Va≈the second passage volume Vb≈the third passage volume Vc≈the fourth passage volume Vd, shown in FIG. 4, may be reduced. Here, if it is considered not desirable to reduce the passage cross-sectional area because this increases the exhaust resistance, it can be said that a length of the first exhaust passage 16*a* may be shortened as much as possible in order to reduce the first passage volume Va. Specifically, it may be desirable to make the length La of the first exhaust passage 16*a* (shown in FIG. 4), for example, six or less times the passage diameter D1 of the exhaust manifold inlet of the first exhaust passage 16*a* (shown in FIG. 8). In this embodiment, the diameter D1=36 mm and the length La≦200 mm and, thus, the condition is fulfilled. Therefore, effective dynamic-pressure supercharge can be expected.

Further, as described above, the passage volumes of the first passage volume Va, the second passage volume Vb, the third passage volume, and the fourth passage volume Vd of the exhaust manifold 16 are approximately equal to each other. If there is a large difference between the volumes of these independent exhaust passages, a scavenging stimulating effect by the ejector effect will also vary greatly between the cylinders. If so, different effects on knock performance will occur, depending on the scavenging effect. As a result, settings are dependent on the cylinder whose knock performance is the lowest, thus obliging other cylinders to reduce their knock performance, and thus waste knock performance even if it is improved for other cylinders over the cylinder with the lowest knock performance. In addition, a variation in the above-described effect of increasing air-intake amount will also occur between the cylinders, by the ejector effect.

According to the configuration of this embodiment, because the volumes of the first passage volume Va, the second passage volume Vb, the third passage volume, and the fourth passage volume Vd are approximately equal to each other, the above-described problems do not exist and, thus, advantages of the ejector effect can be acquired more effectively.

In a common in-line four-cylinder engine, if it is naturally arranged so that the length La of the first exhaust passage 16*a* and the length Ld of the fourth exhaust passage 16*d* are approximately equal, it will be an approximately symmetrical layout as described in this embodiment in which the collective portion 31*c* is arranged in proximity to the center. Thus, if the second exhaust passage 16*b* and the third exhaust passage 16*c* are mutually independent, it is natural that their lengths will be shorter than that of the length La or Ld. In order to intentionally make the lengths equal to La, it will be necessary to have a layout with unnatural bypassing, etc. This causes an increase in the exhaust resistance, or an interruption in shortening of the length La or the length Ld in order to achieve the layout, and, thus, is not desirable.

According to this embodiment, the second exhaust passage 16*b* and the third exhaust passage 16*c* that tend to be small in their volumes are collected to be the auxiliary collected exhaust passage 16*bc*. Thus, the second passage volume Vb and the third passage volume can be easily made approximately equal to the first exhaust passage volume Va and the fourth exhaust passage volume Vd.

Although the second exhaust passage 16*b* and the third exhaust passage 16*c* are collected together, mutual independency of these exhaust passages is still maintained. As shown in Table 1 above, the second cylinder 3*b* and the third cylinder 3*c* are not adjacent to each other in ignition order. Thus, even if considering that the exhaust valve 9 begins to open from before a bottom dead center, and closes after a top dead center, the exhaust valve 9 of the second cylinder 3*b* and the exhaust valves 9 of the third cylinder 3*c* do not have a period during which both are open. Therefore, the mutual exhaust interference does not occur, and the auxiliary collected exhaust passage 16*bc* can be considered as a pseudo extension of the second exhaust passage 16*b* in the exhaust stroke of the second cylinder 3*b*. In addition, in the exhaust stroke of the third cylinder 3*c*, the auxiliary collected exhaust passage 16*bc* can be considered as a pseudo extension of the third exhaust passage 16*c*.

Thus, in this embodiment, the engine is a four-cylinder engine, while realizing the mutual independent relationship of the three exhaust passages. Accordingly, the layout can be reduced in size, and a connecting portion of the housing 31 or the turbocharger 50 can also be reduced in size.

As the exhaust manifold volume is reduced, the dynamic-pressure-supercharge effect will be higher as described above. However, on the other hand, the exhaust temperature tends to be higher in a higher-speed range. Therefore, it may be desirable to improve a heat resistance by using cast steel with a high heat resistance as a material of the exhaust manifold 16, or by having a water-cooled exhaust manifold 16, for example.

(2) Independent Exhaust Choking Control Using Independent Exhaust Passage and Variable Exhaust Valve Next, the independent exhaust choke control using the independent exhaust passages 16*a*, 16*bc*, and 16*d*, and the variable exhaust valve 30 will be described in detail.

This will be explained more specifically referring to FIG. 2. As described above, in the state of FIG. 2, the first cylinder 3*a* is in a blow down, and the second cylinder 3*b* is during an overlapped period. The exhaust gas We led to the first exhaust passage 16*a*, the blow-down gas, is choked by the variable exhaust valve 30. The choked blow-down gas increases in velocity, and decreases in pressure. This choked blow-down gas serves as a driving fluid that causes the ejector effect.

On the other hand, in the collective portion 31*c*, the first exhaust passage 16*a* through which the blow-down gas flows, and the auxiliary collected exhaust passage 16*bc* communicate with each other. Therefore, the exhaust gas We flowing through the auxiliary collected exhaust passage 16*bc* (and the second exhaust passage 16*b*) is sucked out (heretofore referred to as a sucked-out fluid) into the blow-down gas (i.e., a driving fluid) being at a low pressure, and is introduced into the collective portion 31*c* (the ejector effect).

Even after the exhaust valve 9 of the second cylinder 3*b* has been closed after the overlapped period, when the ejector effect of the driving fluid remains, the exhaust gas We remaining in the second exhaust passage 16*b* and the auxiliary collected exhaust passage 16*bc* can be sucked out, and scavenging can be stimulated.

Although a case where the first cylinder 3*a* is in a blow-down state is shown in FIG. 2, it is the same for other cases. For example, when the second cylinder 3*b* is in a blow-down state, the fourth cylinder 3*d* will be in an overlapped state as shown in Table 1. Therefore, the exhaust gas We flowing through the second exhaust passage 16*b* (via the auxiliary collected exhaust passage 16*bc*) serves as a driving fluid, and the exhaust gas We flowing through the fourth exhaust passage 16d serves as a sucked-out fluid. Further, for example, when the third cylinder 3c is in a blow-down state, the first cylinder 3a will be in an overlapped state. Therefore, the exhaust gas We flowing through the third exhaust passage 16c (via the auxiliary collected exhaust passage 16bc) serves as a driving fluid, and the exhaust gas We flowing through the first exhaust passage 16a serves as a sucked-out fluid. Further, for example, when the fourth cylinder 3d is in a blow-down state, the third cylinder 3c will be in an overlapped state. Therefore, the exhaust gas We flowing through the fourth exhaust passage 16d serves as a driving fluid, and the exhaust gas We flowing through the third exhaust passage 16c (via the auxiliary collected exhaust passage 16bc) serves as a sucked-out fluid.

Thus, for the adjacent cylinders in ignition order, there is a relationship that the exhaust gas We of the latter cylinder in the ignition order will be a driving fluid, and the exhaust gas We of the former cylinder in the ignition order will be a sucked-out fluid. On the other hand, in order to appropriately acquire the ejector effect, the exhaust passage of the driving fluid and the exhaust passage of the sucked-out fluid need to be independent upstream of the variable exhaust valve 30. In other words, the exhaust passages of the adjacent cylinders in ignition order need to be mutually independent. In this embodiment, the first exhaust passage 16a and the fourth exhaust passage 16d are clearly independent with respect to other exhaust passages and, thus, they fulfill the above-described conditions. The second exhaust passage 16b and the third exhaust passage 16c are collected upstream of the variable exhaust valve 30 to serve as the auxiliary collected exhaust passage 16bc. However, as described above, because the second cylinder 3b and the third cylinder 3c are not adjacent cylinders in ignition order, they are able to fulfill the above-described conditions even if they are not structurally independent. In short, in this embodiment, because the exhaust passages of the adjacent cylinders are mutually independent in ignition order, the appropriate ejector effect can be acquired.

In order to further improve the ejector effect, the exhaust gas We serving as a driving fluid, and the exhaust gas We serving as a sucked-out fluid may join at a shallow angle as much as possible (an angle close to parallel). In this embodiment, three independent exhaust passages 16a, 16bc, and 16d are arranged in parallel in proximity to their manifold outlet 17, and the parallel arrangement is maintained to the collective portion 31c such that even after the exhaust gas flows into the housing 31, the conditions of the above-described joining angle are fulfilled. That is, a higher ejector effect can be acquired.

Advantages of the ejector effect include the following.

First, one advantage is an increase in the turbine flow rate of the turbocharger 50 (an amount of the exhaust gas We supplied to the turbocharger 50). The turbine flow rate at the time of a blow down is an addition of the normal blow-down gas volume and an amount of the exhaust gas We sucked out by the ejector effect. That is, in this description, the turbine flow rate is accordingly increased. As a result, the turbine drive force increases and the dynamic-pressure supercharge pressure effect can be increased.

Secondly, another advantage is stimulation of scavenging of the exhaust gas We. Because the exhaust gas We serving as a sucked-out fluid is sucked out by the ejector effect and scavenging is stimulated, an exhaust resistance of the cylinder 3 is reduced. In addition, because air intake during an over-lapped period is stimulated by the stimulation of scavenging, the air-intake amount can be increased and an engine torque can also be increased.

Thirdly, another advantage is stimulation of the dynamic-pressure supercharge. As described above, the dynamic pressure supercharge effect can be acquired by reducing the volume of the exhaust manifold 16; an additional effect which can be further stimulated by the ejector effect is described below.

If there is no variable exhaust valve 30, or if the ejector effect is not expectable even if the variable exhaust valve 30 is fully open, the blow-down gas may flow backward to other exhaust passages through the collective portion 31c. This acts as an apparent increase in the volume of the exhaust passage. On the other hand, if the ejector effect is occurring, by the variable exhaust valve 30, the blow-down gas as a driving fluid will suck out the exhaust gas We serving as a driven fluid from other exhaust passages. That is, the blow-down gas does not turn around to the other exhaust passages. This results in an effect as if the exhaust passage volume is reduced in the dynamic-pressure supercharge.

Thus, if the entire exhaust passage volume (i.e., the exhaust manifold volume) is the same, this embodiment producing the ejector effect by the variable exhaust valve 30 can further stimulate the dynamic-pressure supercharge compared with the case wherein there is no ejector effect.

As described above, although the advantages of the ejector effect have been described, this ejector effect will be more remarkable as the exhaust gas We serving as a driving fluid is choked more. The choke can be adjusted by changing the opening of the variable exhaust valve 30, that is, by rotating the flap 35 about the flap shaft 37 (shown by an arrow Z1 in FIG. 2).

The flow of the exhaust gas We in the variable exhaust valve 30 having a particular shape and in proximity to the variable exhaust valve 30 when the variable exhaust valve 30 is fully open is shown in FIG. 8. In FIG. 8, although the exhaust gas We from the first cylinder 3a flows into the housing 31 through the first exhaust passage 16a as shown, the exhaust gases We from other cylinders flow similarly.

When the variable exhaust valve 30 is in a fully-open state, the flap 35 is accommodated in the bulged portion 31b almost completely, and a part of the flap 35 forms a wall surface in the exhaust passage that continues from the exhaust manifold 16.

Therefore, the exhaust gas We from the first exhaust passage 16a smoothly flows into the housing 31 through the manifold outlet 17. Because the divider plates 32 are provided to the upstream portion in the housing 31, the independent state of the exhaust gas is maintained until it reaches the trailing edges 32a of the divider plates 32. The exhaust gas is led to the collective portion 31c without facing the sectorial surface 36 of the flap 35 at the trailing edges 32a, that is without being choked. The exhaust gas We is further led to the housing 51 of the turbocharger 50 from the collective portion 31c.

In this embodiment, the housing 31 is bent downward because of the arrangement of the turbocharger 50. Thus, the exhaust gas We is smoothly led to the turbocharger 50 by the flow-guide plates 33 provided so as to follow the curved flow passage of the housing 31.

As shown in FIG. 5, at the manifold outlet 17, the first exhaust passage 16a and the fourth exhaust passage 16d are arranged in parallel at both sides of the auxiliary collected exhaust passage 16bc. The spatial relationship is maintained down to the collective portion 31c inside the housing 31. Thus, the exhaust gas We from the first exhaust passage 16a or the fourth exhaust passage 16d will flow offset with respect to the center axis of the collective portion 31 c, and if there are no fairing guides 34, a circling flow (swirl) will be generated in the collective portion 31c. In addition, because the circling directions are opposite for the exhaust gas from the first exhaust passage 16a and the exhaust gas from the fourth exhaust passage 16d, the flow of the exhaust gas We is greatly disturbed inside the collective portion 31c. Such disturbance of the exhaust gas may possibly reduce the ejector effect.

To solve this problem, the two fairing guides 34 are provided to regulate the flow of the exhaust gas We. The fairing guides 34 of this embodiment are provided on the extended surfaces of the divider plates 32 to regulate the flow toward the auxiliary collected exhaust passage 16bc from the first exhaust passage 16a, and the flow toward the auxiliary collected exhaust passage 16bc from the fourth exhaust passage 16d. Thus, the above-described circling is controlled, and the flow of the exhaust gas We in the collective portion 31c will be smoother. Therefore, the ejector effect can be further improved.

On the other hand, the flow of the exhaust gas We when the variable exhaust valve 30 is fully closed is shown in FIG. 9. When the variable exhaust valve 30 is in the fully-closed state, the flap 35 rotates to enter into the housing 31, and the sectorial surface 36 interrupts the flow of the exhaust gas We. However, it does not interrupt the flow completely wherein the passage of the inner-bend portion of the flow-guide plate 33 is still secured.

The exhaust gas We from the first exhaust passage 16a flows into the housing 31 through the manifold outlet 17. Because the divider plates 32 are provided to the upstream portion in the housing 31, the independent state of the exhaust gas is maintained upstream of the trailing edges 32a. The exhaust gas is interrupted by the sectorial surface 36 of the flap 35 at the trailing edges 32a, and the choked exhaust gas We flows into the collective portion 31c at the trailing edges 32a of the divider plates 32, that is, at the entering portion of the inner passage of the curve of the bent flow-guide plate 33. In that case, the exhaust gas We that was choked to be a higher speed and lower pressure acts as a driving fluid, and sucks out the exhaust gases We by the ejector effect from the other exhaust passages (primarily, from the auxiliary collected exhaust passage 16bc). These exhaust gases We join and are smoothly led to the housing 51 of the turbocharger 50 by the flow-guide plate 33.

The variable exhaust valve 30 may be at an intermediate open state between fully closed and fully open. In that case, the choking effect of the blow-down exhaust gas We is stronger as the valve is close to the fully closed state and, thus, the ejector effect becomes greater.

Next, an independent exhaust choke control will be described. As described above, the independent exhaust choke control is a control in which ECU 20 (e.g., a variable exhaust valve control module) causes each of the passage cross-sectional areas of the independent exhaust passages 16a, 16bc, and 16d to reduce below the maximum area by the variable exhaust valve 30. Specifically, ECU 20 transmits an opening signal to the actuator 38 of the variable exhaust valve 30, and the actuator 38 then rotates the flap shaft 37 to adjust the rotational angle of the flap 35. In this embodiment, the independent exhaust choke control is performed in a lower-speed range A3 of a supercharging range (see FIG. 13). Specifically, the lower-speed supercharging range A3 is set to a speed range lower than the intercept point at which the waste gate valve 62 begins to open, for example, lower than 2000 rpm. Because the waste gate valve 62 opens to control the supercharge pressure when it becomes higher in the higher-speed range than the intercept point, the supercharge pressure increase by the ejector effect is not necessary in the higher-speed range. Further, to control the exhaust resistance, the variable exhaust valve 30 is made fully open.

In the independent exhaust choke control, as the engine speed Ne becomes lower, the variable exhaust valve 30 will reduce the opening when in the lower-speed supercharging range A3.

As described above, the dynamic-pressure supercharge and the independent exhaust choke control in which the main technical features of this embodiment have been described, are closely related to each other, and collaborate with each other to improve the supercharge performance.

Figure 14:
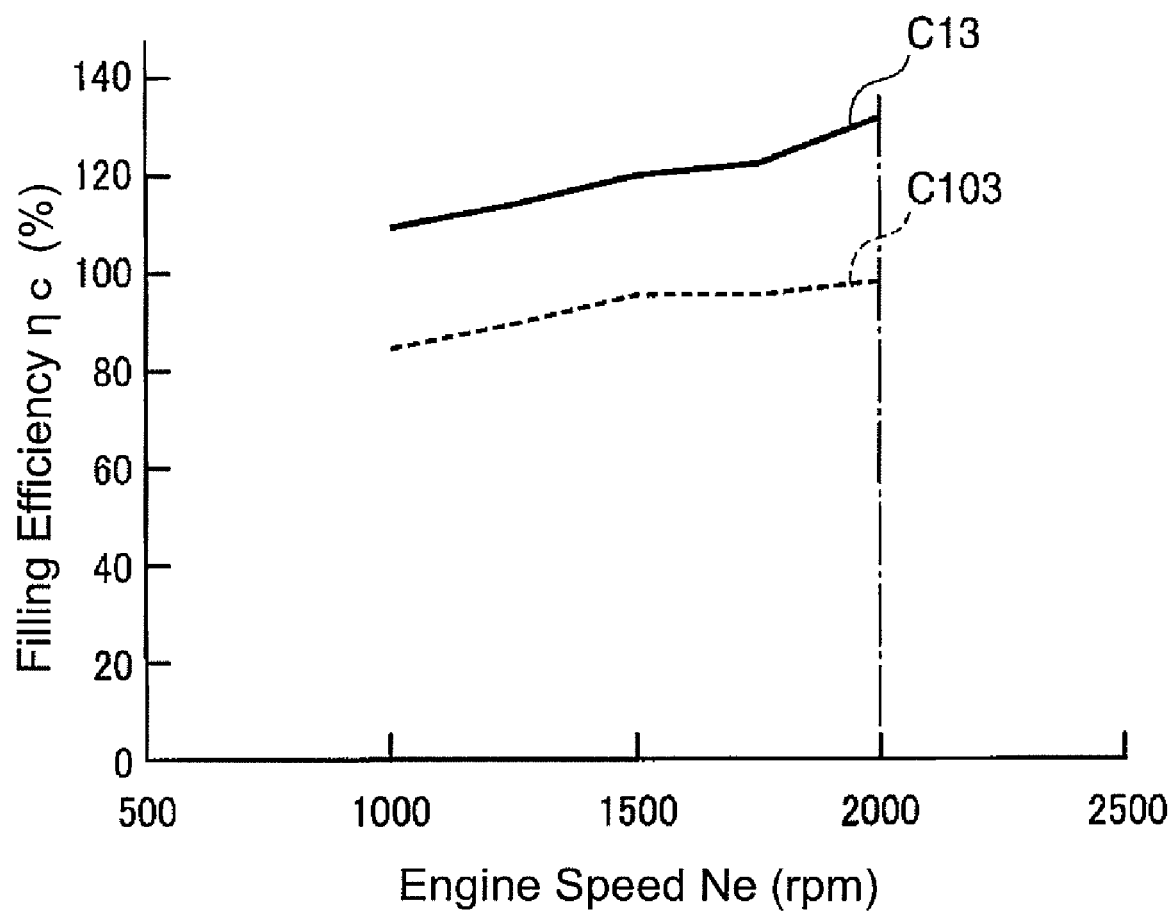
FIG. 14 is a plot showing a filling efficiency in a lower-speed supercharging range.

FIG. 14 is a plot showing a filling efficiency Tc in the lower-speed supercharging range A3. The horizontal axis represents an engine speed Ne (rpm), and the vertical axis represents the filling efficiency $\eta c$ (%). The characteristic C13 is a characteristic of this embodiment in which the dynamic-pressure supercharge and the independent exhaust choke control are used together. The characteristic C103 is shown for comparison, and may be a characteristic when using a common exhaust manifold without the variable exhaust valve 30. The filling efficiency Tic of the characteristic C13 increased approximately 20% to 30% with respect to the characteristic C103. This is an effect of the supercharge pressure increase by the dynamic-pressure supercharge and the independent exhaust choke control using the variable exhaust valve 30.

Figure 15:
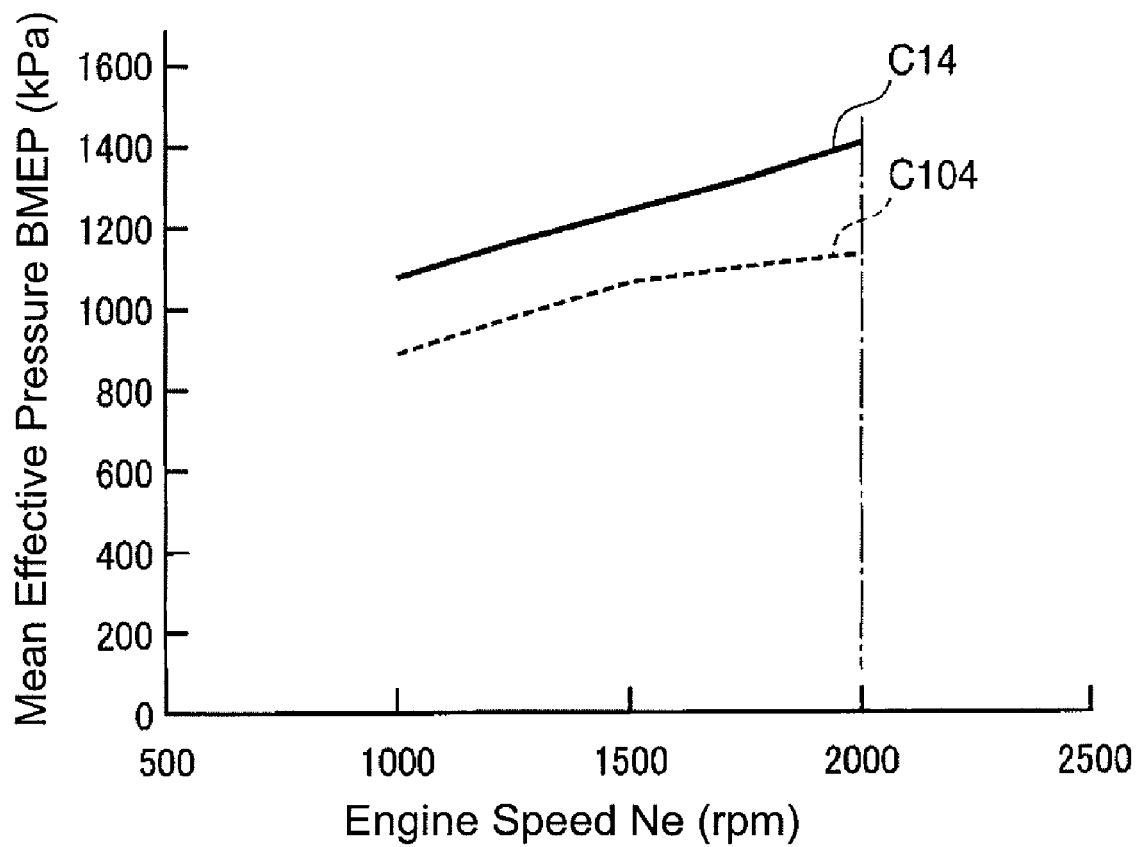
FIG. 15 is a plot showing a mean effective pressure of the engine in the lower-speed supercharging range.

FIG. 15 is a plot showing a mean effective pressure BMEP of the engine in the lower-speed supercharging range A3. The horizontal axis represents an engine speed Ne (rpm), and the vertical axis represents a mean effective pressure BMEP (kPa). The characteristic C14 is a characteristic of this embodiment in which the dynamic-pressure supercharge and the independent exhaust choke control are used together, that is, under the same conditions that produce the characteristic C13 of FIG. 14. The characteristic C104 is shown for comparison, and corresponds to the characteristic C103 of FIG. 14. The mean effective pressure BMEP of the characteristic C14 increased approximately 200 to 400 kPa with respect to the characteristic C104. This is an effect of the filling efficiency being increased by the dynamic-pressure supercharge and the independent exhaust choke control using the variable exhaust valve 30. This, in effect, shows that engine torque is increased.

Next, a further technique adopted in this embodiment to significantly improve the ejector effect is described.

Figure 16:
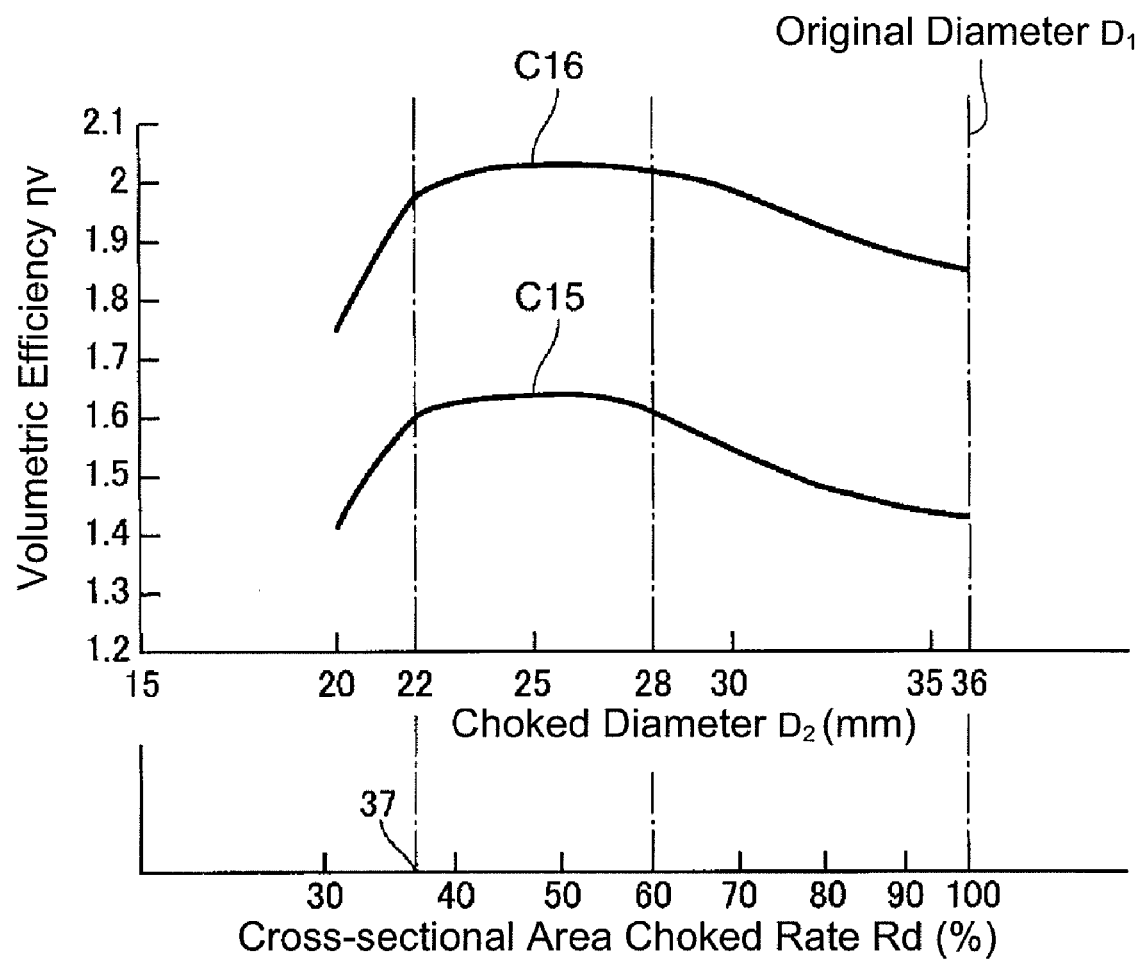
FIG. 16 is a plot showing a relationship between a degree of the choking of an exhaust passage and a volumetric efficiency.

FIG. 16 is a plot showing a relationship between a degree of the choking of the exhaust passage and a volumetric efficiency $\eta v$ in this embodiment. The upper row of the horizontal axis represents a choked diameter D2 (mm). This choked diameter D2 is a diameter of a circle that corresponds to a passage cross-sectional area at the trailing edges 32a of the divider plates 32 when the variable exhaust valve 30 shown in FIG. 9 is fully closed. An inlet portion of the exhaust manifold 16 of the first exhaust passage 16a is a circle of the diameter D1 (original diameter=36 mm), and the passage cross-sectional area S1 of this portion is an area corresponding to the diameter D1.

The lower row of the horizontal axis represents a cross-sectional area choking rate Rd (%). This cross-sectional area choking rate Rd is an area ratio of a choked diameter D2 with respect to the original diameter D1. That is, $Rd=(D2/D1)^2 \times 100$ (%) or $Rd=(S2/S1) \times 100$ (%).

The characteristic C15 shown in FIG. 16 is a characteristic at an engine speed Ne=1500 rpm, and C16 shows a characteristic at 2000 rpm. As is clear from these characteristics, there is a suitable range where the volumetric efficiency $\eta v$ is significantly higher, in a range of the choked diameter D2=22-28 mm (a range of the cross-sectional area choking rate Rd=37-61%). This shows that a significant ejector effect can be acquired in this range. Therefore, by setting the choked diameter D2 within the suitable range, a higher supercharge effect can be acquired, and a further increase in the engine torque can be achieved.

Next, a valve-timing change control by VVT 12 will be described.

Figure 17:
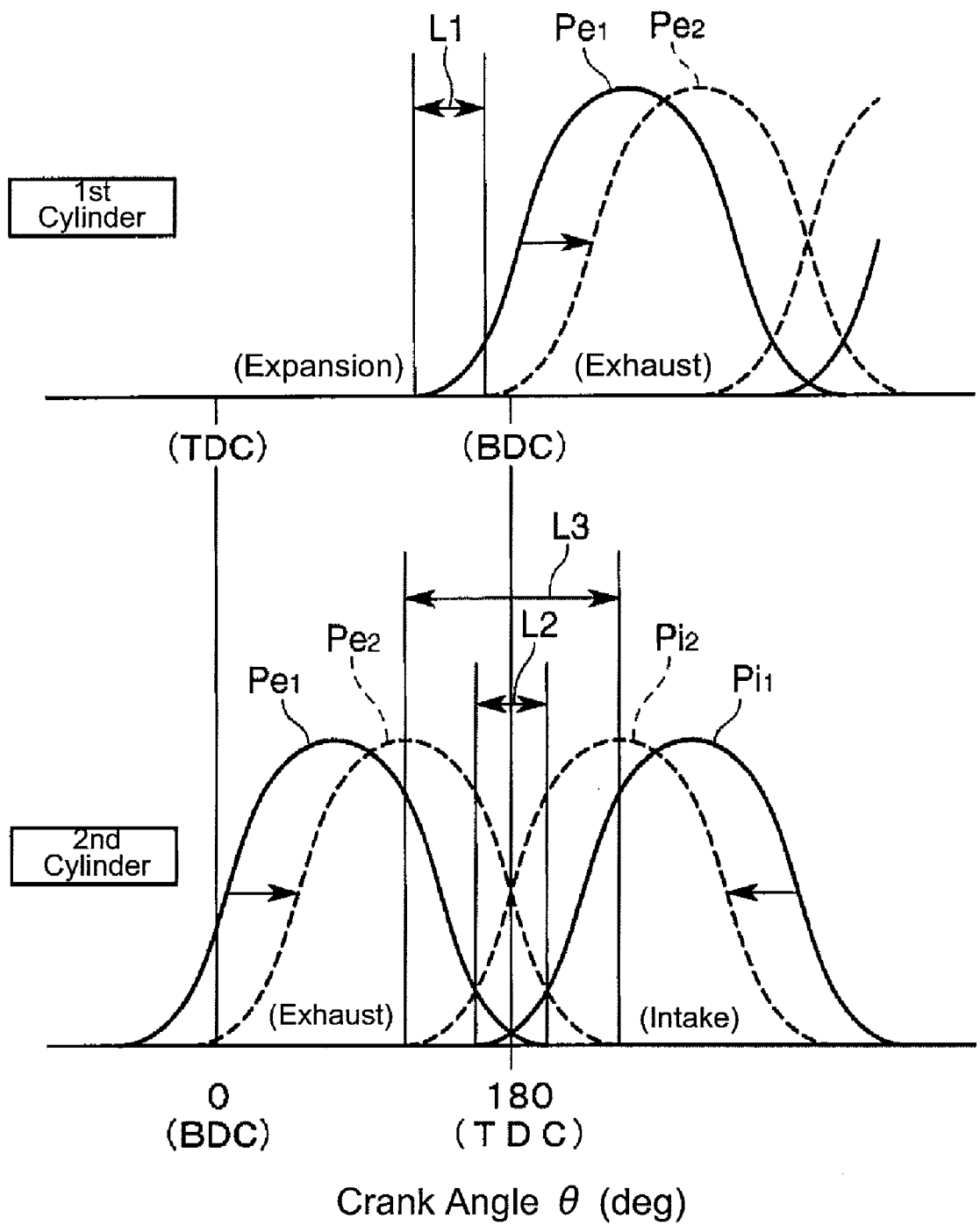
FIG. 17 is a view showing a valve-timing change control.

FIG. 17 is a plot showing the valve-timing change control. The horizontal axis represents a crank angle θ (e.g., degree CA), where a top dead center TDC of the first cylinder 3a is 0 degree CA. The vertical axis schematically represents valve openings of the intake and exhaust valves 7 and 9. The upper row shows a cylinder that is ignited after a previous one of the adjacent cylinders in ignition order, and the lower row shows a previous cylinder that is ignited before that. As an example of this situation, the first cylinder 3a is shown in the upper row, and the second cylinder 3b is shown in the lower row. This shows a condition in which the first cylinder 3a is in a transition period from an expansion stroke to an exhaust stroke (in proximity to a bottom dead center), and the second cylinder 3b is in a transition period from an exhaust stroke to an intake stroke (in proximity to a top dead center). This corresponds to the condition shown in FIG. 2.

An exhaust-valve open period Pe1 and an intake-valve open period Pi1 that are shown by solid lines show a characteristic when the independent exhaust choke control is not performed, that is, when the variable exhaust valve 30 is in a fully-open state, in a natural intake range in this embodiment. Here, an overlap L2 is set in which the exhaust-valve open period Pe1 and the intake-valve open period Pi1 overlap is in proximity to a top dead center of the second cylinder 3b.

Generally, the overlap is provided to fully perform scavenging of the exhaust gas We, and to suck more intake air Wi. Here, there is also an intention to push out the exhaust gas We by the intake air Wi. Similar to a common variable valve timing control, the overlap L2 is changed so that it becomes wider as the engine speed Ne is higher. Specifically, a valve-close timing of the exhaust valve 9 is delayed by the exhaust VVT 12e, and the overlap L2 is expanded by advancing a valve-open timing of the intake valve 7 by the intake VVT 12i. Thus, this may be carried out by either the exhaust VVT 12e or the intake VVT 12i.

In another example, the exhaust-valve open period Pe2 and the intake-valve open period P12 that are shown by dashed lines show a characteristic when the independent exhaust choke control is performed, that is, when the variable exhaust valve 30 chokes the exhaust gas We in the lower-speed supercharging range A3. As illustrated, an overlap L3 in this case is expanded more than the overlap L2 where the independent exhaust choke control is not performed even with the same load and the same engine speed Ne. Specifically, the valve-close timing of the exhaust valve 9 is delayed, and the valve-open timing of the intake valve 7 is advanced.

Originally, the independent exhaust choke control has effects in which scavenging is stimulated by the ejector effect, and an air intake is stimulated during the overlapped period, as described above. Thus, the air-intake amount and the engine torque increase. Therefore, as shown in FIG. 17, the effect can be increased by expanding the overlap L2 to the overlap L3 by VVT 12.

Normally, if the overlap L2 is carelessly expanded, the exhaust gas We may flow backwards by an intake negative pressure. However, under the independent exhaust choke control, because the exhaust gas We is sucked out to a downstream side by the ejector effect, such a backward flow does not easily occur. That is, the overlapped amount can be increased, without the side effect of the backward flow of the exhaust gas We.

As shown by the exhaust-valve open period Pe1 in the upper row of FIG. 17 (the first cylinder 3a), the exhaust valve 9, when not performing the independent exhaust choke control, begins to open at an early stage before a bottom dead center of an exhaust stroke, for example, 40-60 degrees CA before the bottom dead center. Thus, scavenging is stimulated; however, because the exhaust gas We begins flowing during a down stroke of a piston, the blow-down gas is reduced accordingly. This is disadvantageous for the independent exhaust choke control of this embodiment using the blow-down gas as a driving fluid of the ejector effect.

However, in this embodiment, the exhaust-valve close timing is delayed when executing the independent exhaust choke control to increase the overlapped amount, as shown by the dashed line Pe2. This simultaneously delays the exhaust-valve open timing because the valve-open period itself is simply translated. That is, as shown in the upper row of FIG. 17, the exhaust-valve open timing is delayed only by a period L1, and, thereby the blow-down gas is controlled. In addition, because the effect of the piston upstroke pushing out the exhaust gas We is added after a bottom dead center, it can assist the blow-down gas. Thus, the ejector effect can be further increased.

However, if the exhaust valve 9 is opened after the exhaust bottom dead center, there may be a side effect in which the exhaust resistance becomes greater. Thus, it is desirable to limit the delay of the exhaust-valve open timing to immediately before the exhaust bottom dead center, as illustrated in FIG. 17.

Figure 18:
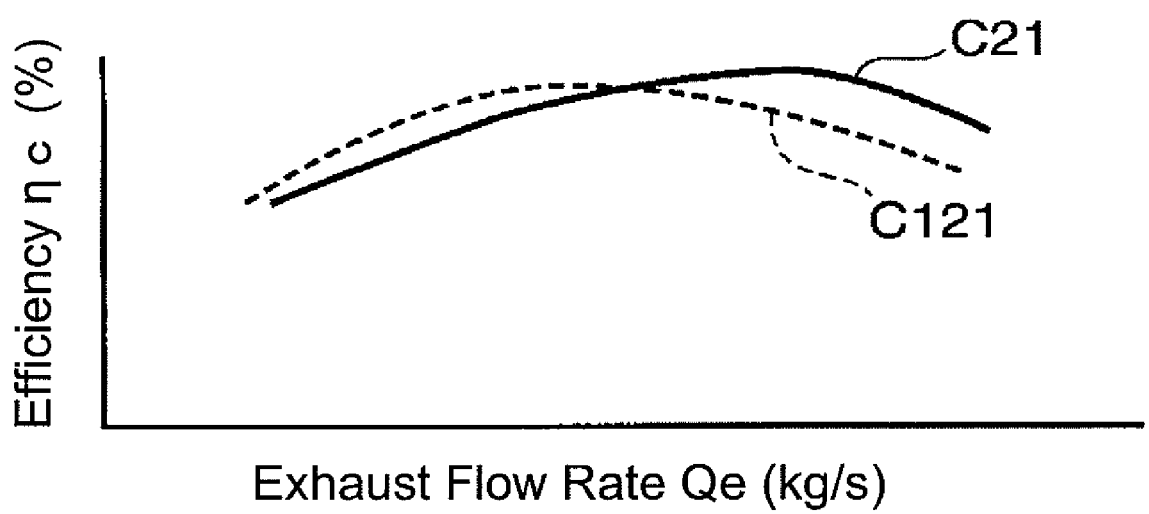
FIG. 18 is a plot showing an efficiency of the turbocharger.

Next, actions and effects of the turbocharger 50 of this embodiment will be described. FIG. 18 is a plot showing an efficiency of the turbocharger 50. The horizontal axis represents an exhaust flow rate Qe (kg/s), and the vertical axis represents an efficiency ηc (%). A characteristic C21 shown by a solid line is a characteristic of the turbocharger 50 of this embodiment, and a characteristic C121 shown by a dashed line is a characteristic of a common large-sized turbocharger. In the common characteristic C121, the efficiency Tic is set so that it has a peak in the vicinity of the center of the operating range of the exhaust flow rate Qe.

On the other hand, because the turbocharger 50 of this embodiment is a large-sized turbocharger as described above, while having a relatively small effective aspect ratio, sometimes referred as A/R ratio, compared with the common large-sized turbocharger, the peak of the efficiency ηc of the characteristic C21 proceeds to the higher flow rate side compared with the characteristic C121, as illustrated. In addition, the peak efficiency value also becomes higher. If the exhaust flow rate Qe is larger, the turbine flow rate Qt will also be larger. Thus, such a setting is suitable for the dynamic-pressure supercharge of this embodiment, intentionally using a range in which the turbine flow rate Qt is large.

Figure 19:
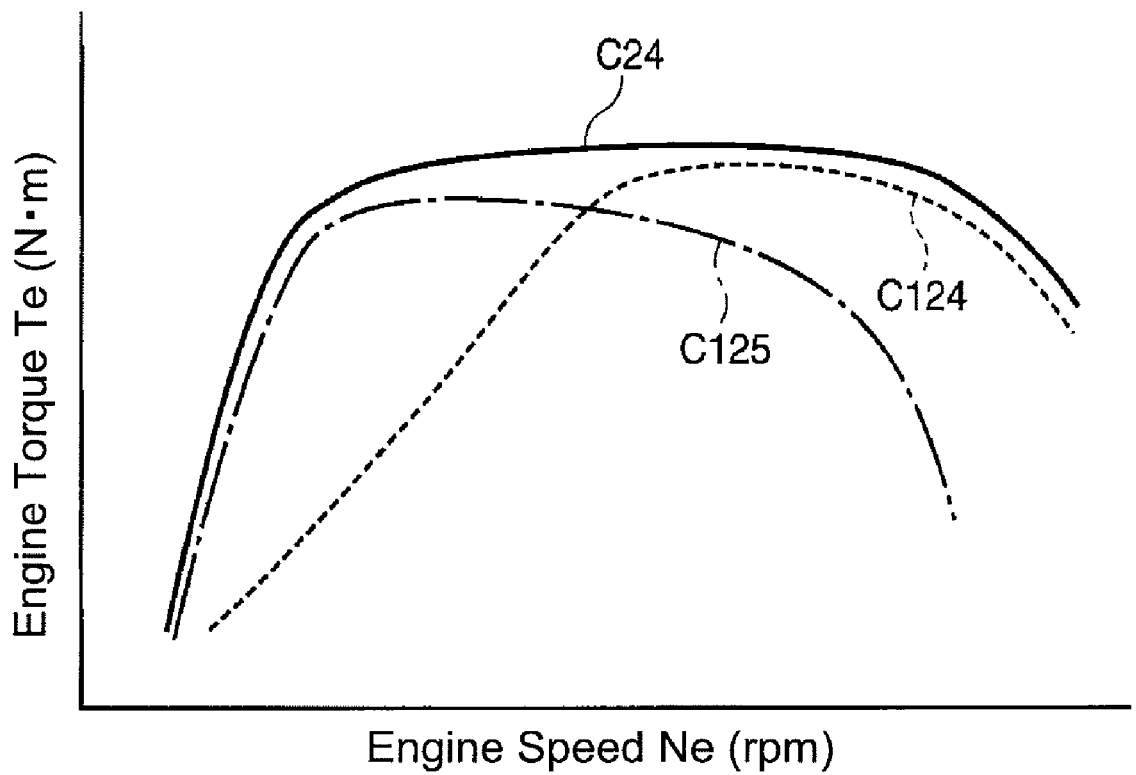
FIG. 19 is a plot showing an engine torque characteristic.

FIG. 19 is a plot showing an engine torque characteristic. The horizontal axis represents an engine speed Ne (rpm), and the vertical axis represents an engine torque Te (N-m). A characteristic C24 shown by a solid line represents a characteristic of this embodiment, and a characteristic C124 shown by a dashed line represents a characteristic when adopted the common large-sized turbocharger and a conventional exhaust system. A characteristic C125 is a characteristic when adopted the conventional exhaust system and a common small-sized turbocharger, wherein a turbine diameter D and A/R are relatively small.

As illustrated, a torque-increasing effect in the higher-speed range by the large-sized turbocharger is powerful for the characteristic C124, and a torque-increasing effect in the lower-speed range by the small-sized turbocharger is powerful for the characteristic C125.

On the other hand, for the characteristic C24 of this embodiment, a torque increasing effect is powerful in the higher-speed range by adopting the large-sized turbocharger 50, and the torque-increasing effect is powerful in the lower-speed range by adopting the dynamic-pressure supercharge, the independent exhaust choke control using the variable exhaust valve 30, the valve-timing change control, and the small A/R turbocharger 50, etc. As a result, this configuration is a simple configuration using a single turbocharger 50; however, it can achieve an increase in the engine torque while acquiring a powerful supercharge effect in a wide range from the lower-speed range to the higher-speed range.

Embodiment 2

Next, another embodiment of the present invention will be described. The second embodiment is similar to that of the first embodiment in that it has the device configuration shown in FIGS. 1-10, performs the dynamic-pressure supercharge and the independent exhaust choke control, and performs the valve-timing change control. In the first embodiment, the independent exhaust control is only performed in the lower-speed supercharging range A3. However, in this embodiment, the control is also performed in the natural intake range, and in addition, a control to increase the overlapped amount is performed. This takes advantage of the effect of the independent exhaust choke control in which the backward flow of the exhaust gas is controlled by the ejector effect even if the overlapped amount is increased. As a result, an overlap expansion response at the time of an acceleration request can be improved.

Figure 13:
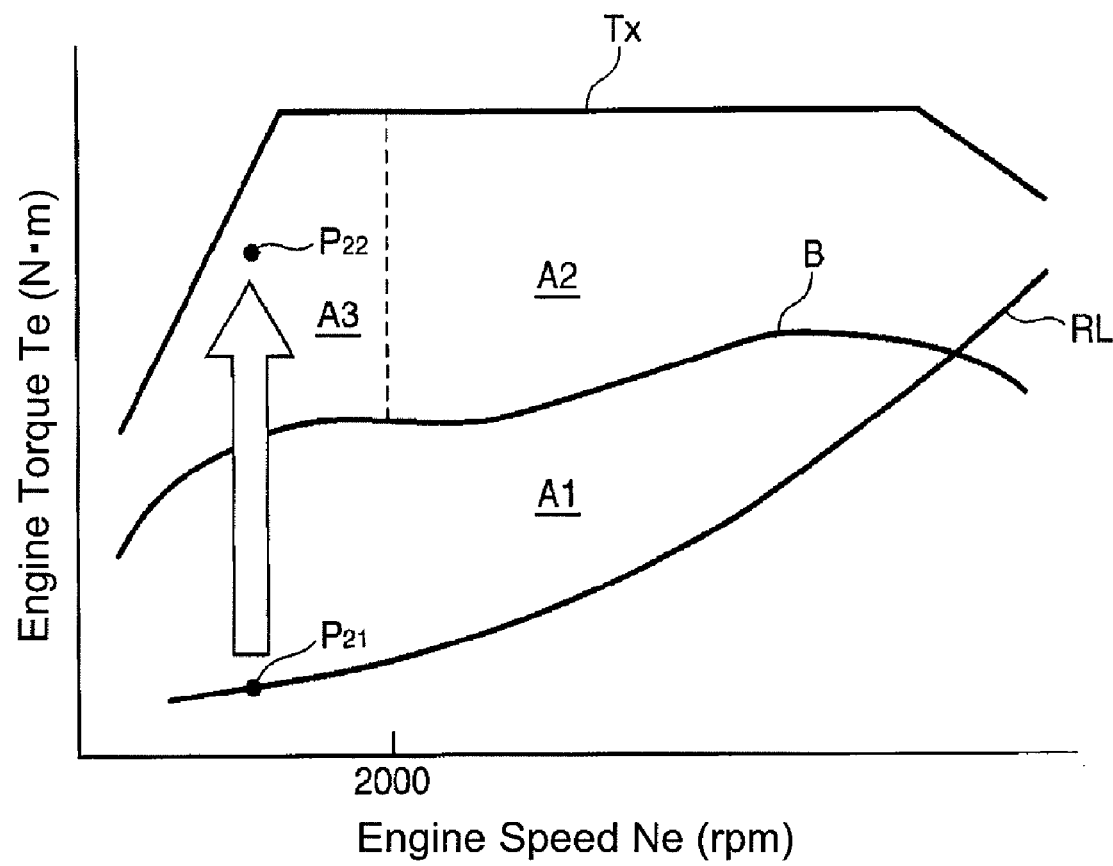
FIG. 13 is a plot of engine torque characteristic according to a second embodiment.

Referring to FIG. 13, the features of this embodiment will be described in detail. The horizontal axis represents an engine speed Ne (rpm), and the vertical axis represents an engine torque Te (N-m). The characteristic Tx represents the maximum load torque, and the characteristic RL represents a torque corresponding to a traveling resistance (also referred to as a "road load"). The reference numeral A1 shows a natural intake range (hereinafter, referred to as a "NA range"), and the reference numeral A2 shows a supercharging range. The characteristic B shows a boundary between the NA range A1 and the supercharging range A2. The lower-speed supercharging range A3 is included in the supercharging range A2.

In this embodiment, the independent exhaust choke control is performed also in the NA range A1, and the exhaust gas We is choked by the variable exhaust valve 30. In addition, VVT 12 expands the overlap L2 (FIG. 17) more than that in the normal condition, that is, when not performing the independent exhaust choke control.

As described above, if the overlap L2 is carelessly expanded, the exhaust gas may flow backward. In this embodiment, because the backward flow of the exhaust gas is controlled by the ejector effect caused by the independent exhaust choke control, the overlap L2 can be expanded without being accompanied with such a side effect.

For example, in FIG. 13, it is assumed that an operating condition quickly shifts from a steady operating condition P21 corresponding to a road load in the NA range A1 to an operating condition P22 in the lower-speed supercharging range A3, according to an acceleration request. In the normal case, the overlap L2 may be set to 0-15 degree CA in the operating condition P21, for example. On the other hand, in the operating condition P22, the overlap L3 is expanded similar to the previous embodiment as shown in FIG. 15, and it may be set to approximately 65 degree CA, for example. Therefore, at the time of the transition from the operating condition P21 to the operating condition P22, VVT 12 may need to significantly change the overlapped amount and, thus, a response delay may cause a problem.

On the other hand, in this embodiment, the overlap L2 in the operating condition P21 is expanded more than that in the normal condition, and may be set to 10-40 degrees CA, for example. Accordingly, the overlap expansion is reduced at the time of the transition to the operating condition P22, and thereby a time for which the transition takes is shortened. That is, the response can be enhanced.

In the higher-speed range (e.g., engine speed Ne>2000 rpm), similar to the previous embodiment, the independent exhaust choke control is not performed in the supercharging range A2, and the variable exhaust valve 30 is fully open. However, the valve-timing change control is performed in this case, and the overlapped amount increases as the engine speed is higher and the load is higher. Thus, in this embodiment, the overlap L2 is expanded more than that in the normal condition, while performing the independent exhaust choke control also in the NA range A1 of such a higher-speed range. Therefore, the response of the overlap change in the higher-speed range can be improved. It may be appropriate that the increase in the overlap is made within a range in which it does not exceed the overlapped amount in the high load range after the transition.

As described above, the embodiments of the present invention can be appropriately modified without departing from the scope of the present invention. For example, the engine I may not necessarily be an in-line four-cylinder engine, but may be other type of engine, such as an in-line six-cylinder engine, six-cylinder V-type engine, and the shape of the exhaust manifold may be modified according to the type of engine.

The exhaust manifold may not necessarily have the auxiliary collected exhaust passage, and each exhaust passage may be completely independent down to the variable exhaust valve.

The variable exhaust valve may be any other valve that can change each passage cross-sectional area of the independent exhaust passage, and is not necessarily limited to the structure of the above-described variable exhaust valve 30. For example, it may be a valve that can independently change each passage cross-sectional area of the independent exhaust passage. Further, the flap 35 may not necessarily be a sector-shaped, but may be a plate-like flap, for example.

Embodiment 3

Figure 20:
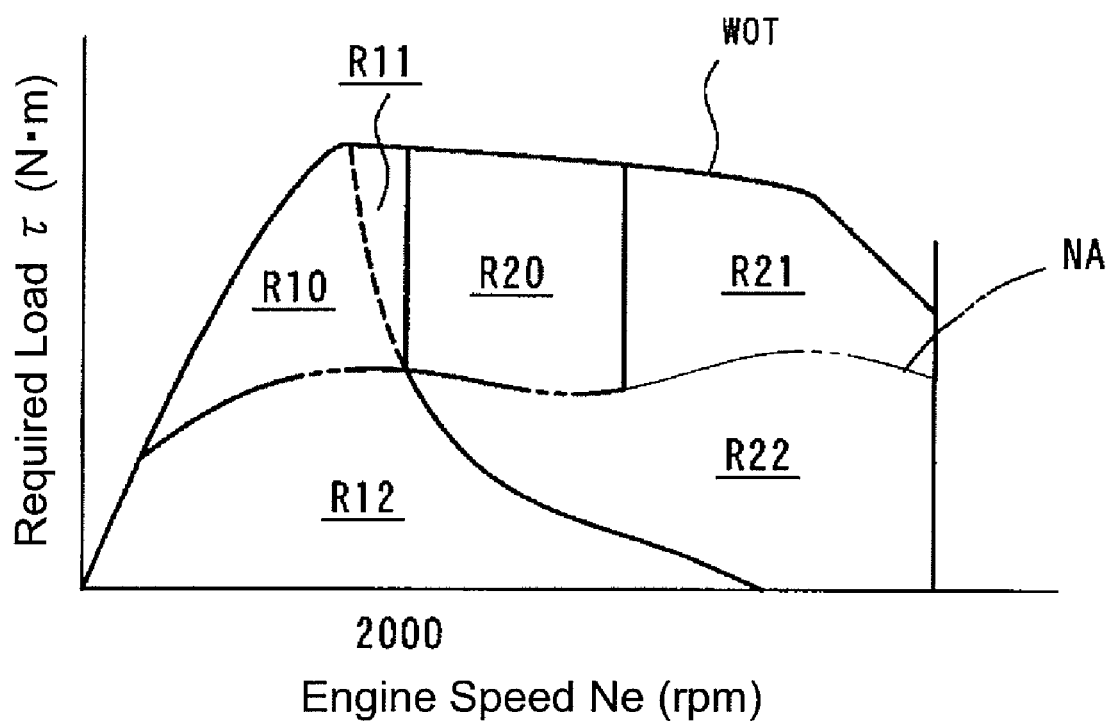
FIG. 20 is a characteristic plot showing an example setting for an operating range to perform a control according to an operating condition according to a third embodiment.

FIG. 20 is a characteristic plot showing an example setting for an operating range in which a control according to an operating condition according to a third embodiment of the present invention is performed, which has the configuration of FIGS. 1-10. In FIG. 20, the horizontal axis represents an engine speed Ne (rpm), and the vertical axis represents a required torque τ (N-m). The characteristic WOT shows a maximum load torque (engine-fully-open operating range). Supercharge operating ranges R10, R11, R20, and R21 on a higher-load side, and the natural-intake operating ranges R12 and R22 on a lower-load side are set bordering on the characteristic NA.

Referring to FIG. 20, in this embodiment, among the operating ranges R10-R22, an independent exhaust choking mode is performed in the supercharge operating ranges R10 and R11 on the lower-speed side, and the natural-intake operating range R12. In the independent exhaust choking mode, ECU 20 as a variable exhaust valve control module which drives the variable exhaust valve 30 to reduce the effective opening area S2 of each of the outlets 17a, 17bc, and 17d of the independent exhaust passages 16a, 16bc, and 16d more than the maximum area, that is, an opening area when the variable exhaust valve 30 is fully open. Specifically, ECU 20 transmits an opening signal to the actuator 38 of the variable exhaust valve 30, and the actuator 38 rotates the flap shaft 37 to adjust the rotational angle of the flap 35. In the independent exhaust choking mode, the variable exhaust valve 30 is closed according to an operating range, and the variable exhaust valve 30 chokes the effective opening area S2 as the request load becomes larger. In this embodiment, in the supercharge operating range R11 below a predetermined lower-speed speed (for example, below 2000 rpm), an adjustment control in which the effective opening area S2 is reduced is performed as the load becomes higher. In the operating ranges R20, R21, and R22, the effective opening area S2 is set to fully open.

Next, when the operating range is the supercharge operating range R10 or the supercharge operating range R11 on the lower-speed side (in the illustrated example, a supercharge operating range of 2000 rpm or less), ECU 20 controls the overlapped amount and a fuel-injection amount in a so-called "afterburning mode." The afterburning mode is a mode in which at least an air-fuel ratio is made richer than a theoretical air-fuel ratio within a flammable range, and the overlapped amount is expanded more than a predetermined range so that non-combusted fuel is discharged from the engine 1 to be combusted on the upstream side of the exhaust turbocharger 50.

Figure 21:
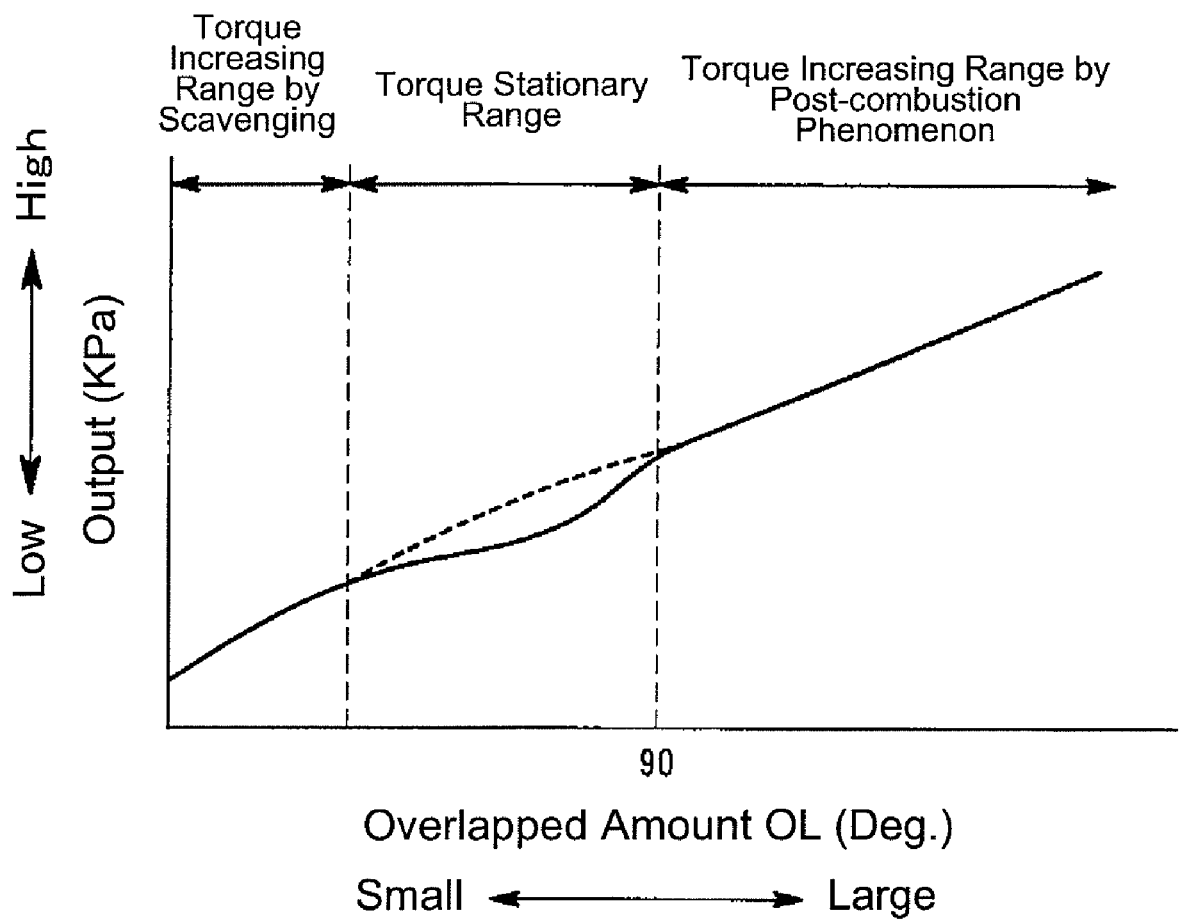
FIG. 21 is a plot showing a afterburning phenomenon according to the third embodiment.

FIG. 21 shows a plot showing the afterburning phenomenon (labeled as "post-combustion phenomenon" in FIG. 21) according to this embodiment. In FIG. 21, the horizontal axis represents an overlapped amount (overlapped period) OL indicated by crank angle, and the vertical axis represents an output (KPa).

Referring to FIG. 21, during an operation in the independent exhaust choking mode, if the overlapped amount OL is increased, due to the combusted gas that is scavenged, at first, the filling efficiency by the scavenging improves and the output improves. However, when the overlapped amount OL becomes more than a certain amount, a filling amount of fresh air remained inside a cylinder will not be proportional to a blow-out amount by the overlap, and the output will be stabilized (referred to as a "torque stationary range"). However, if the overlapped amount OL is increased, exceeding the torque stationary range where the output is stabilized, non-combusted fuel is then discharged to the exhaust passage, and the discharged non-combusted fuel is combusted on the upstream side of the exhaust turbocharger, and thereby the afterburning phenomenon occurs. This fact has been found out by the present inventors.

When the afterburning phenomenon occurs, because a supercharge pressure will increase by combustion in the exhaust passage, the supercharge performance is improved significantly, and the engine output and fuel consumption reduction is also remarkably improved. Further, the exhaust temperature will also be higher, so it can contribute to activation of the catalyst 63. Thus, in this embodiment, the afterburning phenomenon is positively used according to the operating condition of the engine 1 to improve the output and an exhaust purification performance.

Figure 22:
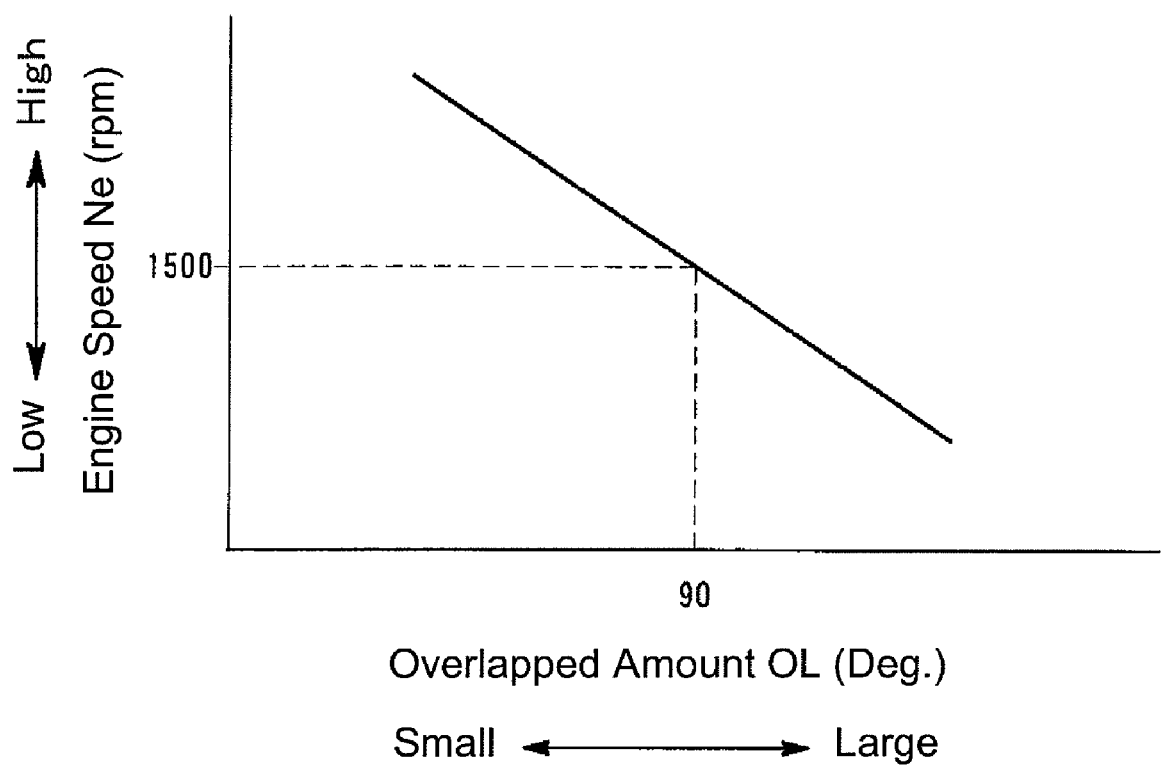
FIG. 22 is a plot showing a relationship between an overlapped amount and an engine speed.

FIG. 22 is a plot showing a relationship between the overlapped amount OL and the engine speed Ne. In FIG. 22, the horizontal axis represents the engine speed Ne (rpm), and the vertical axis represents the overlapped amount OL indicated in crank angle.

As a result of the inventor's devoted studies, it became clear that, because the afterburning phenomenon occurs, a required overlapped amount OL will be smaller as the engine speed Ne becomes larger, and the afterburning phenomenon occurs at 1500 rpm, for example, when the crank angle is greater than 90 degree CA. Therefore, in the operating range R10 and R11 shown in FIG. 20, when it is switched to the afterburning mode, ECU 20 sets the overlapped amount OL of the valve-open periods IN and EX more than 90 degree CA to control the engine 1.

Next, the overlap of the intake valve 7 and the exhaust valve 9 in the afterburning mode is preferred to be set around an exhaust top dead center so that the exhaust valve 9 is closed relatively late.

Figure 23A:
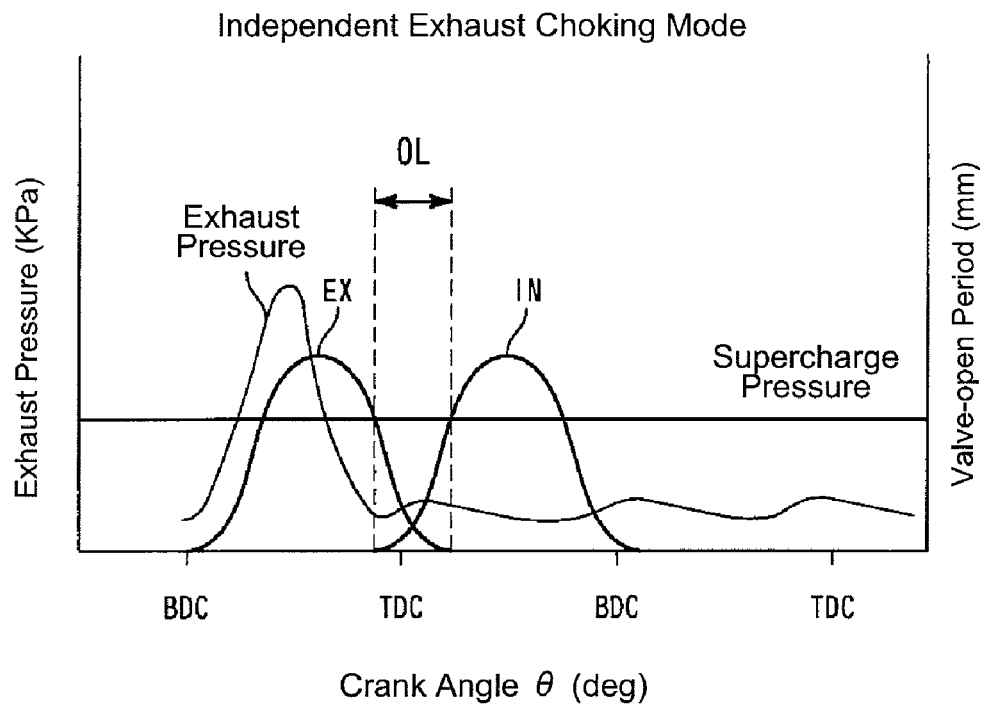
FIG. 23A shows an independent exhaust choking mode (when the variable exhaust valve is fully closed)
Figure 23B:
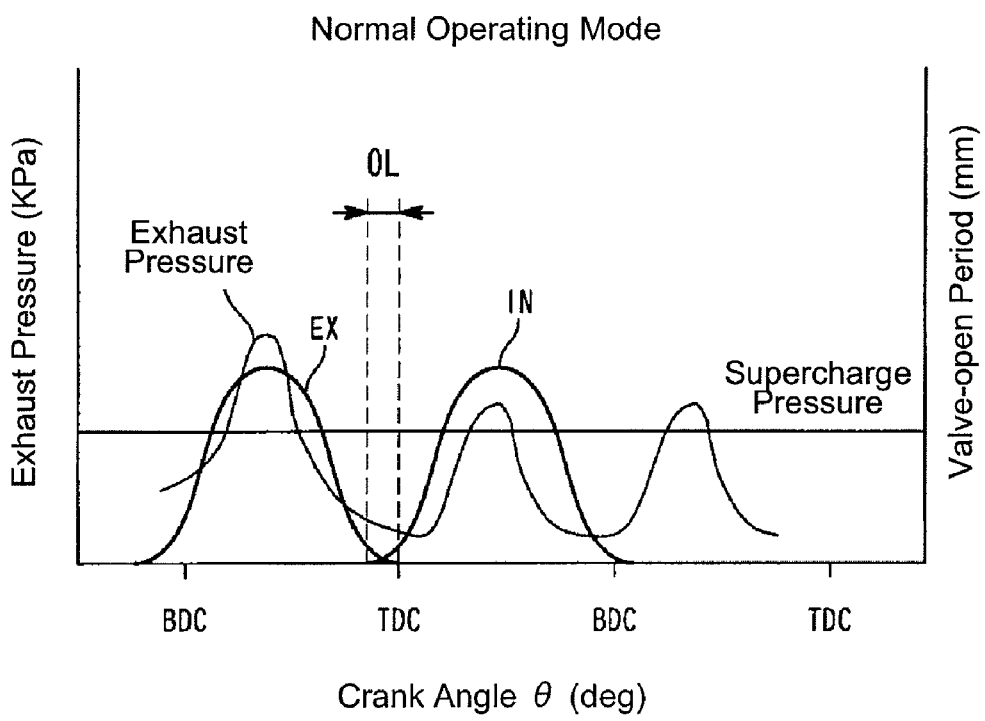
FIG. 23B shows a normal operating mode (when the variable exhaust valve is fully open).

FIGS. 23A and 23B are exhaust characteristic plots, where FIG. 23A shows the independent exhaust choking mode, when the variable exhaust valve is fully closed, and FIG. 23B shows the normal operating mode, when the variable exhaust valve is fully open. In FIG. 23A and 23B, the horizontal axis represents a crank angle θ of the first cylinder 3a, where a top dead center is set to 0 degree CA, and the vertical axis represents an exhaust pressure (KPa) and a valve-open period (mm). The valve-open periods of the intake valve 7 and the exhaust valve 9 are shown by IN and EX, respectively.

Referring to FIG. 23A, the blow down characteristic in the independent exhaust choking mode is hardly influenced by the blow-down peak of other cylinders due to the sucking effect of the exhaust gas caused by the ejector effect. Thus, it is preferred, from a viewpoint of the improvement of the output, to retard the valve-close timing of the exhaust valve 9, and to make the valve-open periods EX and IN overlap with each other around the exhaust top dead center.

On the other hand, as shown in FIG. 23B, the exhaust pressure when the variable exhaust valve is fully closed is influenced by the blow-down peak of other cylinders. Thus, when the valve-open periods EX and IN overlap after the exhaust top dead center, the exhaust pressure exceeds a supercharge and scavenging may become impossible.

Therefore, in this embodiment, a relatively large overlapped amount OL (for example, 65 degree CA) is employed only in the supercharge operating range R20 shown in FIG. 20, and the overlapped amount OL is set to as small as possible in the operating ranges R12, R21 and R22 (for example, 0-40 degrees CA). When the intake valve-open period IN and the exhaust valve-open period EX overlap in the operating range R12, and R20-R22, the overlapped amount OL is expanded by retarding the valve-close timing of the exhaust valve 9 and advancing the valve-open timing of the intake valve 7 as the engine speed Ne becomes higher. This may be carried out by either the exhaust VVT 12e or the intake VVT 12i. Particularly, an appropriate overlapped amount OL is determined and mapped based on experiments for each engine, and is stored in a memory of ECU 20. The control is performed by reading the overlapped amount OL from the map according to the operating condition.

Next, in the afterburning mode, a fuel-injection amount is adjusted to make the air-fuel ratio in a rich condition in the flammable range, for example, A/F 14.0-12.7. According to the air-fuel ratio setting, it may be possible that non-combusted fuel is combusted when it is discharged from the exhaust valve 9 to the independent exhaust passages 16a-16d of the exhaust manifold 16 of the exhaust passage by the blow down, and the supercharge pressure of the exhaust turbocharger 50 is appropriately increased.

ECU 20 normally controls operation of the engine 1 in an electric-supercharge-bypass mode in which intake air Wi bypasses the electric supercharger 83, while, in a predetermined operating condition, controlling the operation of the engine 1 in the electric supercharge mode in which the electric supercharger 83 is operated. In the electric-superchargebypass mode, the electric supercharger 83 shown in FIG. 1 is stopped, and the intake control valve 85 of the bypass passage 84 is fully opened. The intake air Wi passed through the intercooler 82 then bypasses the electric supercharger 83 to be supplied to the engine 1. On the other hand, in the electric supercharge mode, the electric supercharger 83 shown in FIG. 1 is operated, and the intake control valve 85 of the bypass passage 84 is fully closed. The intake air Wi passed through the intercooler 82 is supercharged to the electric supercharger 83 to be supplied to the engine 1.

Generally, VVT 12 switches hydraulics to switch the open timings of the intake valve 7 and the exhaust valve 9. Thus, when switching the overlapped amount OL of the open timing, it may be obliged to pass the torque stationary range shown in FIG. 21. Thus, in this embodiment, when the valve timing is switched to achieve a target torque, the supercharge performance is assisted by driving the electric supercharger 83 in the operating condition in which the overlapped amount OL of the valve-open periods IN and EX passes through the torque stationary range. Therefore, in this embodiment, ECU 20 functions as an electric supercharge control module.

At a cold start of the engine 1, the catalyst 63 may not reach its active temperature in many cases, and it may take a considerable period of time until the catalyst 63 reaches the active temperature depending on the operating condition. Thus, in this embodiment, when a temperature condition relevant to the catalyst 63 is below a predetermined temperature Tst set at approximately the active temperature, the operating variable exhaust valve 30 is operated in the independent exhaust choking mode without depending on the operating range, as is clear from the description below referring to flowcharts, to set the combustion condition of the engine 1 in the afterburning mode. The temperature condition relevant to the catalyst 63 may be the temperature of the catalyst 63 itself, or may be an alternative characteristic, for example, exhaust temperature.

Next, a control example of the engine system according to this embodiment will be described.

Figure 24:
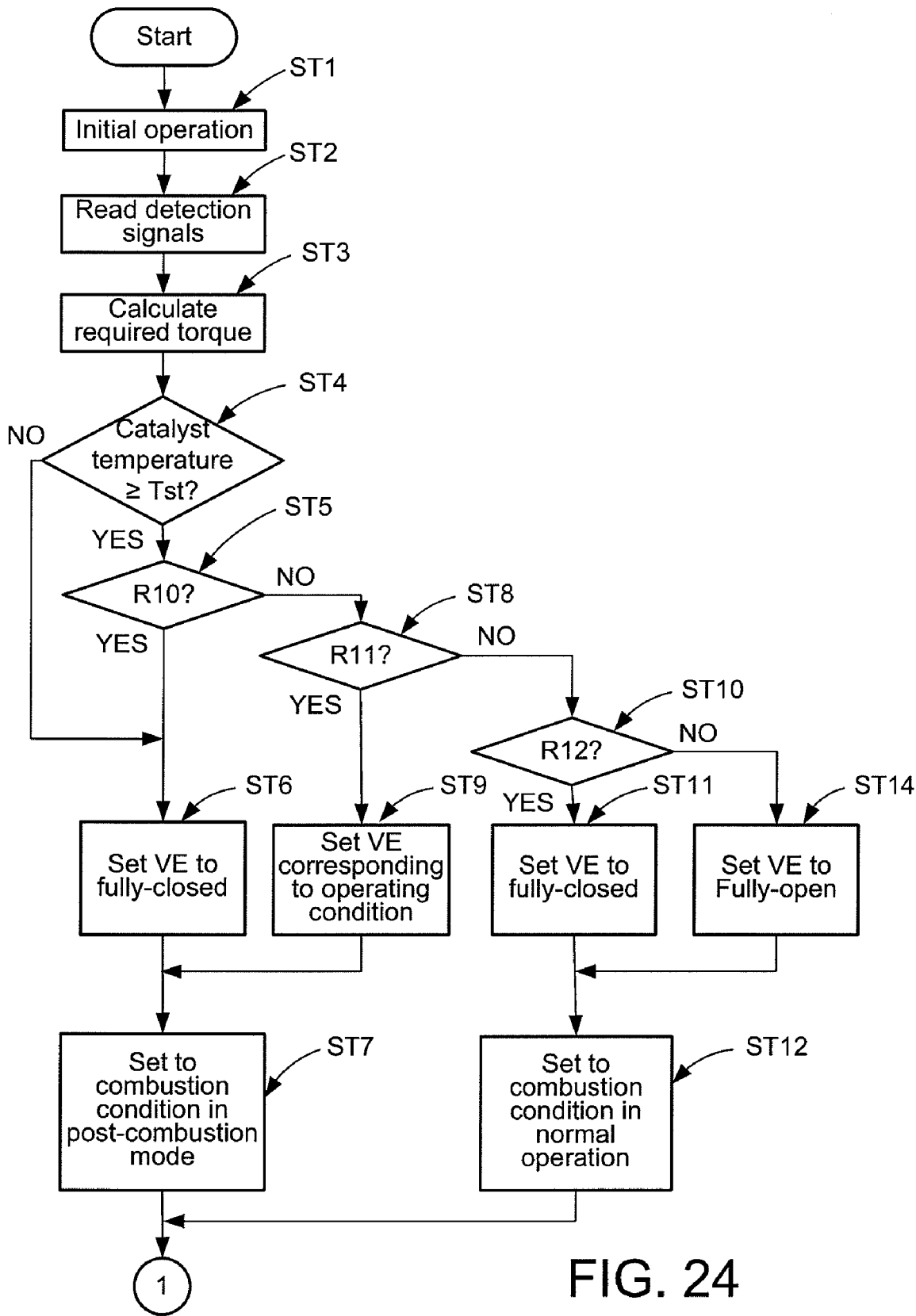
FIG. 24 is a flowchart showing a control example of an engine system in the third embodiment of the present invention.
Figure 25:
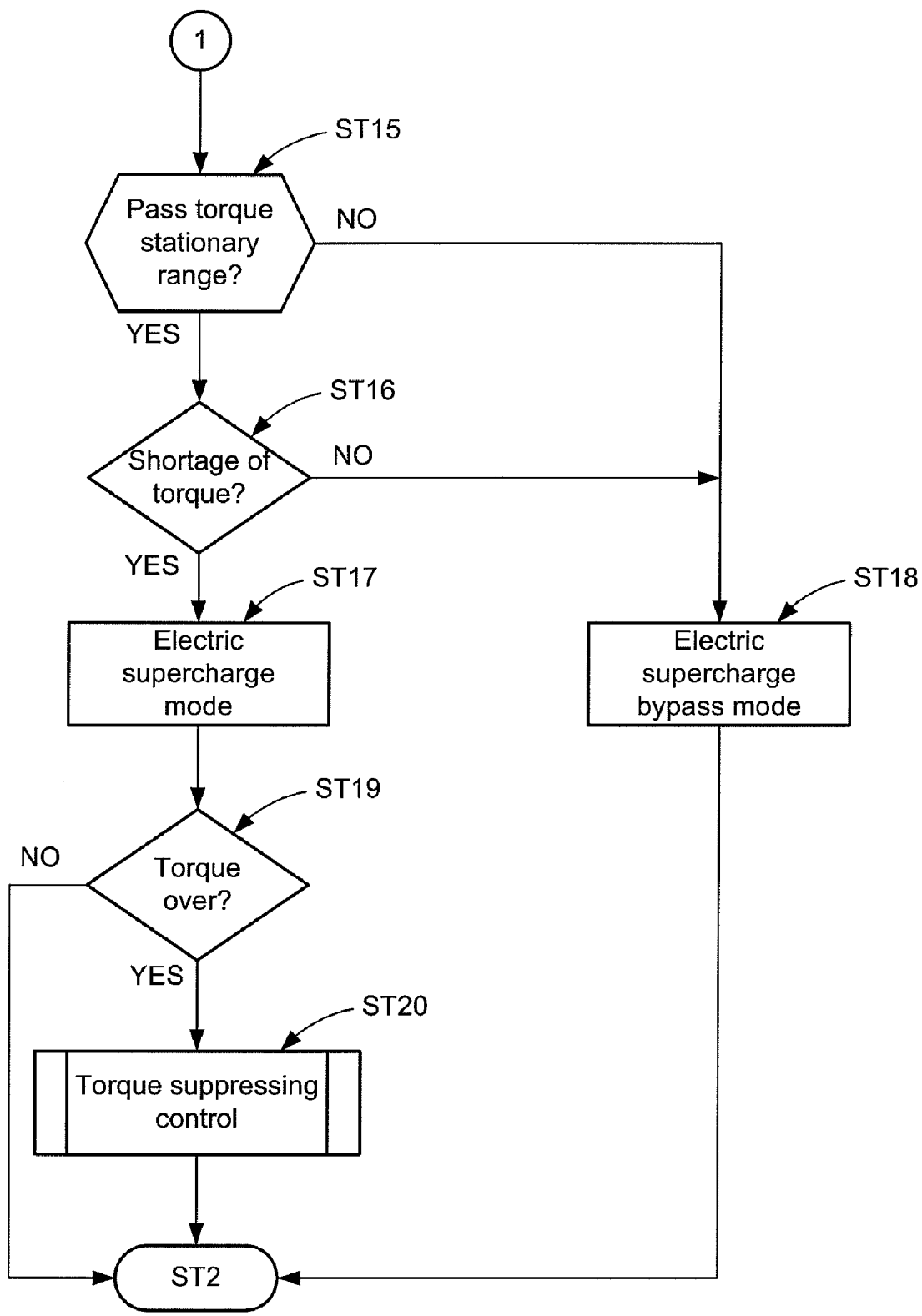
FIG. 25 is a flowchart showing the control example of the engine system in the third embodiment of the present invention, together with FIG. 24.

FIGS. 24 and 25 are flowcharts showing the control example of the engine system in this embodiment of the present invention.

First, referring to FIG. 24, ECU 20 performs initialization of flags or memories as its initial operation (Step ST1). Here, in this embodiment, by the initial operation of Step ST1, the electric-supercharge-bypass mode is selected, and the intake control valve 85 provided to the bypass passage 84 of the electric supercharger 83 is set to fully open so that the intake air Wi passed through the intercooler 82 bypasses the electric supercharger 83 to be supplied to the engine 1 through the bypass passage 84.

After the initial operation of Step ST1, ECU 20 reads detection signals inputted from the input elements (Step ST2), and then calculates a required torque of the engine 1 based on the values of the read detection signals (Step ST3). After the required torque is calculated, ECU 20 determines, based on the detection signals read at Step ST2 (specifically, a detection value of the exhaust temperature sensor SN7) whether the temperature of the catalyst 63 reached the predetermined temperature Tst defined based on the active temperature of the catalyst 63 (Step ST4). If the catalyst 63 has not reached the predetermined temperature Tst, ECU 20 proceeds to the flow from Step ST6 to stimulate the increase in the catalyst temperature. As a result, it is possible to stimulate the increase in the temperature of the catalyst 63 by the afterburning phenomenon at the time of cold start, in an operating condition with a low catalyst temperature, for example.

On the other hand, when the catalyst temperature has reached the active temperature, ECU 20 determines whether the target operating range is the supercharge operating range R10 on the lower-speed side (Step ST5).

If the target operating range is the supercharge operating range R10, ECU 20 fully closes the variable exhaust valve 30 to enter the independent exhaust choking mode (Step ST6). In addition, ECU 20 sets the control mode of the engine 1 to the afterburning mode, and then sets the overlapped amount OL of the valve-open periods IN and EX and the air-fuel ratio to the above-described settings (Step ST7). As a result, the ejector effect by the exhaust gas flow is produced, the amount of the input flow rate into the exhaust turbocharger 50 (e.g., an amount of the exhaust gas We per unit time supplied to the exhaust turbocharger 50) is increased, the drive force of the turbine scroll 54 is increased, and the supercharge pressure is increased. In addition, because the exhaust gas We serving as a sucked-out fluid is sucked out to stimulate the scavenging, the exhaust resistance of the cylinder 3 is reduced. In addition, the pressure of the blow-down gas and the dynamic-pressure supercharge performance is improved.

More specifically, referring back to FIG. 2, the first cylinder 3a is at a state immediately after the exhaust valve has opened, and the second cylinder 3b is in the overlapped period in the state shown in FIG. 2, as described above. The exhaust gas We led to the first exhaust passage 16a, that is blow-down gas is choked by the variable exhaust valve 30. The choked blow-down gas increases in flow velocity and decreases the pressure. This choked blow-down gas functions as a driving fluid that causes the ejector effect and, thus it sucks out the exhaust gas We as a sucked-out fluid flowing through the auxiliary collected exhaust passage 16bc (and the second exhaust passage 16b) to introduce it into the collective portion 31c. Even after the exhaust valve 9 of the second cylinder 3b is closed, after the overlapped period, if the ejector effect of the driving fluid remains, the exhaust gas We remaining in the second exhaust passage 16b and the auxiliary collected exhaust passage 16bc can be sucked out to stimulate scavenging. Although FIG. 2 shows the case where the first cylinder 3a is in the blow-down state, the same can be said for other cases, as is clear from Table 1 and FIG. 3. In this embodiment, the outlets 17a, 17bc, and 17d of the three independent exhaust passages 16a, 16bc, and 16d are approximately arranged in parallel in proximity to the manifold outlet 17, and the parallel arrangement of the outlets 17a, 17bc, and 17d is maintained down to the collective portion 31c even after the exhaust gas flows into the housing 31. Therefore, a high ejector effect can be acquired.

Subsequently, by the control of Step ST7, the valve-open period IN of the intake valve 7 and the valve-open period EX of the exhaust valve 9 overlap, and the overlapped amount OL is set greater than at least 90 degree CA. Thus, because the air-fuel ratio is set rich greater than 14, non-combusted fuel in the cylinder is discharged toward the exhaust turbocharger 50 with high-speed exhaust gas, and is combusted before the turbine scroll 54, thus the afterburning phenomenon occurs. The afterburning phenomenon increases the exhaust temperature, and significantly increases the supercharge pressure for driving the turbine scroll 54. Thus, a high supercharge performance can be demonstrated at the time of cold start, and it also contributes to the improvement in the output of the engine 1. Further, because exhaust temperature is increased by the afterburning phenomenon, the temperature of the catalyst 63 is also increased. Thus, at the time of cold start, the catalyst can reach its active temperature in a relatively short time, and high exhaust purification performance can be demonstrated.

In the determination of Step ST5, if the target operating range is not a supercharge operating range, ECU 20 further determines whether the target operating range is a supercharge operating range R11 that is operated in the independent exhaust choking mode (Step ST8).

If the operating range is the supercharge operating range R11, ECU 20 sets an opening of the variable exhaust valve 30 according to a target load (Step ST9), and then proceeds to Step ST7 to perform the afterburning mode. As a result, it is also possible to improve the supercharge performance by the afterburning phenomenon in the supercharge operating range R11 of FIG. 20.

Further, in the determination of Step ST8, if the target operating range is not the supercharge operating range R11, ECU 20 further determines whether the target operating range is a natural-intake operating range R12 with operation of the independent exhaust choking mode (Step ST10).

If the operating range is the natural-intake operating range R12, ECU 20 fully closes the variable exhaust valve 30 (Step ST11). Thus, the dynamic-pressure-supercharge effect is improved, the supercharge input flow rate is increased by the ejector effect, and the supercharge performance is increased. Thus, scavenging may be improved, the output of the engine 1 is improved, and the fuel consumption is reduced. In this operating range, the overlapped amount OL and the air-fuel ratio are controlled according to the engine speed or the target load in this operating condition (Step ST12).

Further, in the determination of Step ST10, if the target operating range is not the natural-intake operating range R12, ECU 20 fully opens the variable exhaust valve 30 (Step ST14), and then proceeds to Step ST12 to control the overlapped amount OL or the air-fuel ratio according to the engine speed and the target load in the operating range.

Next, a control method is carried out after performing the procedures of Step ST7 or Step ST12 as will be described referring to FIG. 25.

As shown in FIG. 25, after performing the procedures of Step ST7 or Step ST12 accompanied with the setting change of VVT 12, ECU 20 determines whether the overlapped amount OL of the valve-open periods IN and EX is such that it passes through the torque stationary range shown in FIG. 21 (Step ST15). If it passes through the torque stationary range, ECU 20 further determines whether a shortage of the torque occurs (Step ST16). The shortage of the torque may be determined by determining whether the engine speed Ne is below an expected speed within a predetermined time, for example.

If ECU 20 determined at Step ST16 that the shortage of the torque has occurred, ECU 20 then carries out an operation control of the engine 1 in the electric supercharge mode (Step ST17). Thus, the electric supercharger 83 is operated, the intake control valve 85 of the bypass passage 84 is fully closed, and the intake air Wi passed through the intercooler 82 is supercharged to the electric supercharger 83 to be supplied to the engine 1.

Subsequently, ECU 20 determines whether excessive torque, herein referred to as a "torque over" has occurred (Step ST19). If the torque over has occurred, ECU 20 performs the torque-suppressing-control subroutine ST20 described later. On the other hand, if the torque over has not occurred, ECU 20 returns to Step ST2 to repeat the above-described control method. That is, in the electric supercharge mode, in order to increase the response of the electric supercharge, if the output is increased so that the torque exceeds the target torque, ECU 20 performs the torque-suppressing control of the subroutine ST20 described below. Therefore, use of the electric supercharge is controlled, and the power consumption is reduced.

After driving the electric supercharger 83 in the electric supercharge mode, ECU 20 returns to Step ST2 to repeat the above-described control.

On the other hand, if ECU 20 determines that it has not passed through the torque stationary range in Step ST15, or if ECU 20 determines that the shortage of the torque has not occurred in Step ST16, ECU 20 sets the operating mode of the electric supercharger 83 to the electric supercharge bypass mode (Step ST18). Thus, the electric supercharger 83 is stopped, the intake control valve 85 of the bypass passage 84 is fully opened, and the intake air Wi passed through the intercooler 82 bypasses the electric supercharger 83 and is supplied to the engine 1.

Figure 26:
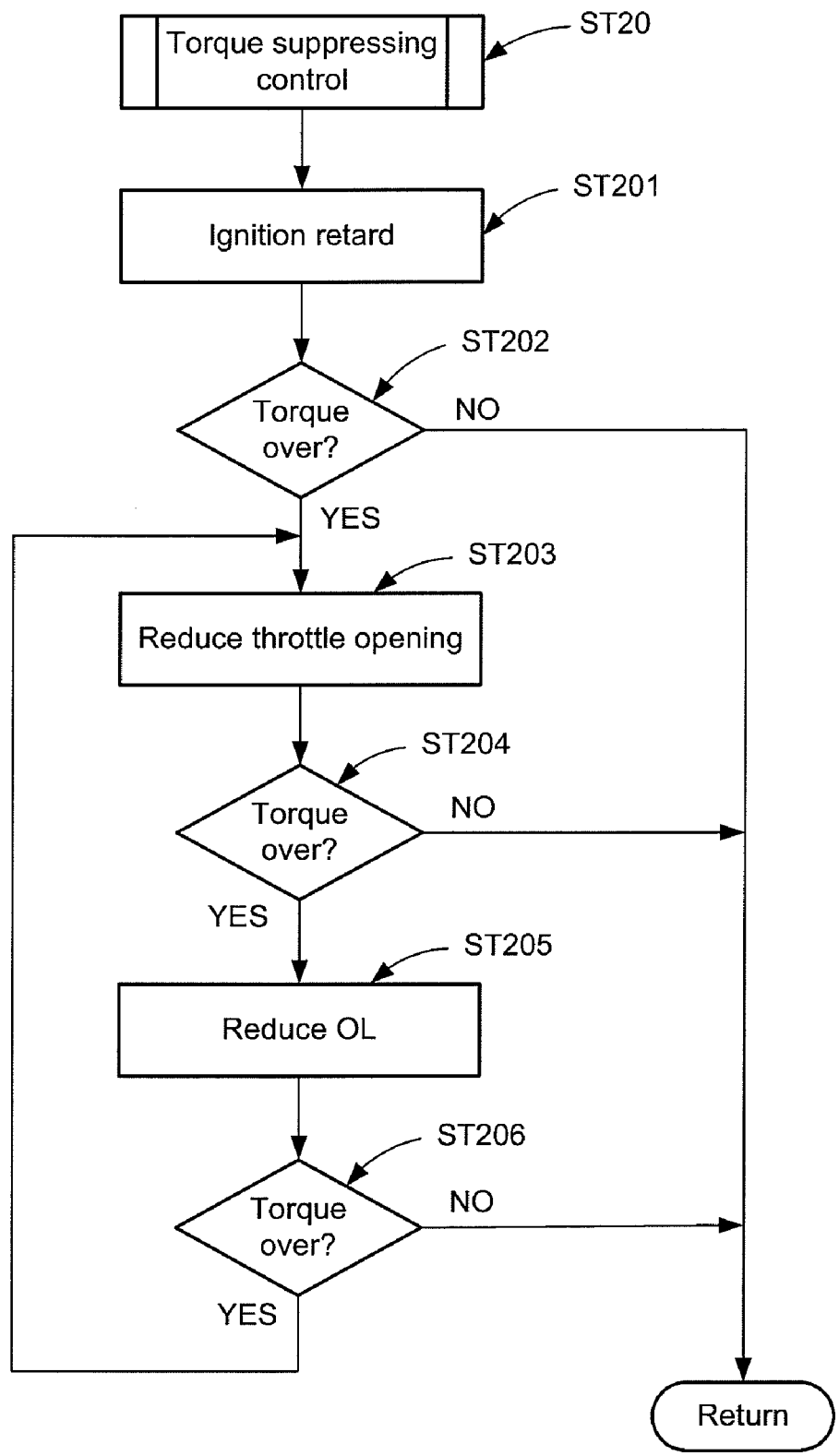
FIG. 26 is a flowchart showing a torque suppressing control subroutine of FIG. 24.

FIG. 26 is a flowchart of the torque-suppressing-control subroutine shown in Step ST20 of FIG. 24.

Referring to FIG. 26, if the torque suppressing control subroutine ST20 is performed, ECU 20 performs an ignition retard ST201 (Step ST201), and then determines whether the torque over still occurs (Step ST202). By the ignition retard, combustion inside the cylinder becomes slower, and kinetic energy in an expansion stroke is reduced, while the exhaust temperature is also decreased, and thereby decreases the supercharge pressure. If the torque over has occurred also by the ignition retard (Step ST202), ECU 20 further reduces the opening of the throttle valve 81 (throttle opening) (Step ST203), and then determines whether the torque over still occurs (Step ST204). By reducing the throttle opening (Step ST203), the filling amount in the cylinder is reduced and the torque decreases. The blow down also decreases and the supercharge pressure is also reduced. Even if the throttle opening is reduced and the torque over still occurs, ECU 20 further carries out the drive control of VVT 12 to reduce the overlapped amount OL (Step ST205), and then determines whether the torque over still occurs (Step ST206). By reducing the overlapped amount OL, scavenging is controlled and the torque decreases. The blow down also decreases and the supercharge pressure is also reduced.

After performing the procedures of Step ST201, ST203, and ST205, if the torque over is solved, ECU 20 returns to the original routine. On the other hand, even if the procedures of Step ST205 is performed, if the torque over is not solved, ECU 20 again performs the procedures from Step ST 203.

As described above, in the third embodiment, in the predetermined lower-engine-speed operating ranges R10-R12, by the variable exhaust valve 30 switches to the independent exhaust choking mode in which the effective opening area S2 of the outlets 17a-17d of the independent exhaust passages 16a-16d is reduced below the maximum area value, the ejector effect can be acquired at the outlets 17a-17d of the exhaust manifold 16. According to this ejector effect, even if it is in a relatively lower-speed and lower-load operating range, the input flow rate of the exhaust turbocharger 50, that is an amount of the exhaust gas per unit time supplied to the exhaust turbocharger 50, can be increased. Further, by increasing the blow-down peak due to the ejector effect, the improvement in the dynamic-pressure supercharge effect or scavenging can be stimulated.

In addition, when the engine 1 is operated in the supercharge operating ranges R10 and R11 among the lower-engine-speed operating ranges R10-R12 where the variable exhaust valve 30 operates in the independent exhaust choking mode, the afterburning phenomenon may occur because the combustion conditions of the fuel-air mixture are set so that non-combusted fuel is combusted on the upstream side of the exhaust turbocharger 50. If the afterburning phenomenon occurs, the pressure of the exhaust gas increases, thereby causing the supercharge pressure to increase and thus the supercharge performance can be increased significantly. Therefore, even if a relatively large-sized exhaust turbocharger 50 is adopted, a great supercharge performance can be obtained in the lower-speed operating range of the engine 1.

In this embodiment, the device includes the electric supercharger 83 provided to the intake passage 80 of the engine 1. If the overlapped amount OL, when combustion of the fuel-air mixture of the engine 1 is controlled in the afterburning mode, is in the predetermined torque stationary range, the device also includes the electric supercharge control module (e.g., ECU 20) that carries out the operation control of the electric supercharger 83. For this reason, in this embodiment, when the intake valve 7 and the exhaust valve 9 are operating with an overlapped amount OL that does not cause the afterburning phenomenon, the electric supercharger 83 is operated, the supercharge pressure increases, and the insufficiency of the output can be compensated. That is, as shown in FIG. 21, the overlapped amount OL may be increased during operation in the independent exhaust choking mode such that the torque stationary range is produced in which scavenging is saturated and the afterburning phenomenon does not occur, in an OL range between that which improves scavenging and that which improves the supercharge performance according to the afterburning phenomenon. Thus, in this embodiment, while the intake valve 7 and the exhaust valve 9 are operating in such a torque stationary range, the supercharge performance is compensated by the electric supercharger 83 and a high output is maintained in a large operating range. In addition, because the operating range where the electric supercharger 83 operates is only the above-described torque stationary range shown in FIG. 8, the operating ratio of the electric supercharger 83 can be reduced to a minimum.

Further, in this embodiment, the combustion control module controls the overlapped amount OL in the afterburning mode to at least greater than 90 degrees in crank angle. For this reason, in this embodiment, in the operating condition in which it should be operated in the afterburning mode, the afterburning phenomenon can be produced with a high probability, supercharge performance can be improved, and the output can be improved.

Thus, in this embodiment, in the predetermined operating ranges R10 and R11, because combustion of the fuel-air mixture of the engine 1 is controlled in the afterburning mode, there is improvement of the supercharge performance caused by the improvement in scavenging due to the independent exhaust choking mode performed in the operating ranges R10 and R11, and an increase in the supercharge input flow rate, etc. In addition, by the improvement in the supercharge performance by the afterburning phenomenon, reduction in the fuel consumption and improvement in the output can be further achieved. Therefore, according to the present invention, prominent effects in which the operating ratio of the electric supercharger 83 is reduced as much as possible while a high supercharge performance can be demonstrated over a wide operating range of the engine 1, can be provided.

Next, still another technical feature in this embodiment will be described.

(1) Improvement in Supercharge Performance by Dynamic-Pressure Supercharge

In this embodiment, because the above-described independent exhaust passages 16*a*-16*d* are adopted, the dynamic-pressure-supercharge effect can be demonstrated. This effect is the same as that described referring to FIGS. 11 and 12, and 14-16 in the first embodiment and, thus, explanation thereof will be omitted herein.

(2) Ejector Effect

As described above, also in this embodiment, a large ejector effect can be acquired by the independent exhaust choking mode using the independent exhaust passages 16*a*, 16*bc*, and 16*d*, and the variable exhaust valve 30.

Four advantages by the ejector effect according to this embodiment follow.

Firstly, an advantage is the increase in the input flow rate of the exhaust turbocharger 50 (e.g., an amount of the exhaust gas We supplied to the exhaust turbocharger 50 per unit time). The input flow rate immediately after the exhaust valve opening is a sum of the exhaust flow rate at the time of the normal blow down and the exhaust flow rate sucked out by the ejector effect. As a result, the drive force of the turbine scroll 54 and the supercharge pressure can be increased. Therefore, in a partial-load operating range, even if it is the operating range in which flow of the exhaust gas to the exhaust turbocharger is conventionally avoided in order to reduce a back pressure, a high supercharge performance can be demonstrated.

Secondly, the ejector effect can stimulate scavenging of the exhaust gas We. Because the exhaust gas We serving as a sucked-out fluid is sucked out by the ejector effect and scavenging is stimulated, the exhaust resistance of the cylinder 3 is reduced. In addition, because air intake during the overlapped period is stimulated by the stimulation of scavenging, the air-intake amount and the engine torque can be increased.

Thirdly, the ejector effect can stimulate the dynamic-pressure supercharge. As described above, the dynamic-pressure supercharge effect can be acquired by reducing the volume of the exhaust manifold 16. The dynamic-pressure supercharge effect can be further stimulated by the ejector effect as described below.

If there is no variable exhaust valve 30, or even if it exists and it is fully open, and if the ejector effect cannot be expected, the blow-down gas flows backward into other exhaust passages through the collective portion 31*c*. This acts as an apparent increase in the volume of the exhaust passage. On the other hand, if there is the ejector effect by the variable exhaust valve 30, the blow-down gas serving as a driving fluid sucks out the exhaust gas We serving as a driven fluid from the other exhaust passages. That is, it does not turn around into the other exhaust passages. This provides an operation in which the exhaust passage volume is reduced in the dynamic-pressure supercharge.

As described above, if the entire exhaust passage volume is the same, this embodiment that provides the ejector effect by the variable exhaust valve 30 can further stimulate the dynamic-pressure supercharge compared with that without the ejector effect.

Fourthly, there is positive use of the afterburning phenomenon caused by the expansion of the overlapped amount OL.

Even if the overlapped amount OL is set to a large value, the possibility that the exhaust gas may flow backward by the intake negative pressure is reduced. Thus, also in the natural-intake operating range R12, a relatively large overlapped amount OL can be secured, and it can further contribute to the stimulation of scavenging. In addition, in the supercharge operating ranges R10 and R11 at a lower speed, it becomes possible to secure a large overlapped amount OL, that is, a crank angle of 90 degree CA or greater, that causes non-combusted fuel to be post-combusted. For this reason, an operation by the afterburning mode as described above is allowed to further contribute to the reduction in the fuel consumption and the improvement in the output.

Further, as described above, the first passage volume Va to the fourth passage volume Vd of the exhaust manifold 16 are approximately equal. If there is a large difference between the volumes of these independent exhaust passages, the scavenging stimulating effect by the ejector effect will also vary greatly between the cylinders. Thus, a difference may also be caused in the anti-knock performance that depends on the scavenging. As a result, the setting is obliged to depend on a cylinder of the lowest anti-knock performance. Therefore, even if anti-knock performances of other cylinders are improved, said improved performance may have to be wasted to achieve equivalent anti-knock performance in all cylinders. Further, the above-described increasing effect of the air-intake amount by the ejector effect may vary between the cylinders.

According to the configuration of this embodiment, because the first passage volume Va through the fourth passage volume Vd are mutually approximately equal, these problems do not exist and the advantages of the ejector effect can be acquired more effectively.

In a common engine with a supercharger, if arranged naturally so that the length La of the first exhaust passage 16a and the length Ld of the fourth exhaust passage 16d is approximately equal, the arrangement will be approximately a symmetrical layout similar to that of this embodiment in which the collective portion 31c is arranged in proximity to the center. Doing so, if the second exhaust passage 16b and the third exhaust passage 16c are mutually independent, it is natural that their lengths become shorter compared with the length La or the length Ld. Thus, if the lengths are forcibly extended to the length La, the layout will have unnatural bypasses. This is not preferred because an increase in the exhaust resistance is caused, or the shortening of the length La or the length Ld is disturbed to achieve the unnatural layout.

According to this embodiment, the auxiliary collected exhaust passage 16bc is provided for collecting the second exhaust passage 16b and the third exhaust passage 16c that tend to be small in volume. Therefore, the second exhaust passage length Lb or the third exhaust passage length Lc containing the length of the auxiliary collected exhaust passage 16bc is made approximately equal to the first exhaust passage length La or the fourth exhaust passage length Ld. As a result, the first passage volume Va through the fourth passage volume Vd can be made mutually approximately equal.

The mutual independency of the exhaust passages is maintained even if the second exhaust passage 16b and the third exhaust passage 16c are collected. As shown in Table 1 and FIG. 3, because the second cylinder 3b and the third cylinder 3c are not adjacent to each other in ignition order, the exhaust valve 9 begins to open from before a bottom dead center. Then, even if considering that the valve closes after a top dead center, there is no period during which the exhaust valve 9 of the second cylinder 3b and the exhaust valves 9 of the third cylinder 3c are both open. Therefore, exhaust interference between the second cylinder 3b and the third cylinder 3c cannot be caused. Further, the auxiliary collected exhaust passage 16bc can be considered as a pseudo extension of the second exhaust passage 16b in the exhaust stroke of the second cylinder 3b, and the auxiliary collected exhaust passage 16bc can be considered as a pseudo extension of the third exhaust passage 16c in the exhaust stroke of the third cylinder 3c.

As described above, in this embodiment, the engine is a four-cylinder engine, and the mutual independent relationship is realized for three independent exhaust passages. Thus, the layout can be reduced in size and the connecting portion with the housing 31 or the exhaust turbocharger 50 can also be reduced in size.

As described above, the dynamic-pressure-supercharge effect and the ejector effect are the main technical features of this embodiment described and these are closely related to each other, working together to improve the supercharge performance and further contribute to reduction in fuel consumption and/or improvement in the output.

The embodiments described above may be appropriately modified without departing from the scope of the present invention.

For example, the setting values, such as the length La, volume Va, diameters D1 and D2, of the first exhaust passage 16a, etc. are not limited to the values described in the above embodiments. These values may be modified as suitable values are determined according to a size or displacement of the engine.

Further, the valve-timing change control by VVT 12 is not necessarily required, other than the operation control in the afterburning mode, although there are many advantages if performed. Thus, the fundamental effects of the present invention can also be acquired without the control.

Further, instead of the flap 35 of the variable exhaust valve 30, a rotor that switches passages by its rotational phase may be adopted.

Further, as the electric supercharger, the electric supercharger 83 separately configured from the exhaust turbocharger 50 as shown in FIG. 1 (also referred to as "e-Boost") may be adopted, or a type of electric supercharger in which the turbine scroll 54 of the exhaust turbocharger 50 is driven by a motor (also referred to as "e-Turbo") may be used.

Therefore, the above embodiments only illustrate desirable examples of the present invention, and the present invention is not to be limited to the configuration of the above embodiments. The configuration may be changed in any way within the scope of the claims of the present invention.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An engine system with turbocharger comprising:
an exhaust manifold having plural independent exhaust passages, each of the exhaust passages being connected to an exhaust port of a corresponding engine cylinder;
a collective part formed by gathering said independent exhaust passages in said exhaust manifold or on a downstream side of said exhaust manifold;
an exhaust turbocharger connected to a downstream side of said collective part;
a variable exhaust valve for changing each passage cross-sectional area of said independent exhaust passages at an upstream side of said collective part;
an exhaust valve timing changing mechanism; and
a controller for controlling said variable exhaust valve;
wherein said controller is configured to perform independent exhaust throttle control for reducing a passage cross-sectional area of at least one of said independent exhaust passages below a maximum area with said variable exhaust valve at least in a predetermined low engine speed range in a supercharging operation range of said engine;
wherein said predetermined low engine speed range is a range where an engine speed is lower than a predetermined engine speed at which a waste gate valve of said exhaust turbocharger begins to open;

wherein said controller is further configured to decrease said passage cross-sectional area as the engine speed becomes lower during said independent exhaust throttle control; and wherein said controller is further configured to retard an exhaust valve opening timing via said exhaust valve timing changing mechanism such that an exhaust valve opening timing at which said independent exhaust throttle control is performed, is later than an exhaust valve opening timing at which said independent exhaust throttle control is not performed, delay of the exhaust valve opening timing being limited to immediately before the exhaust bottom dead center.

2. The engine system with turbocharger of claim 1,
wherein the a valve timing changing mechanism is capable of changing an overlap period wherein both of an intake and an exhaust valve are opened by changing at least one of intake and exhaust valve opening or closing timing, wherein said controller is configured to enlarge said overlap period via said valve timing changing mechanism such that an overlap period at which said independent exhaust throttle control is performed is larger than an overlap period at which said independent exhaust throttle control is not performed.

3. The engine system with turbocharger of claim 2,
wherein said controller is further configured to perform said independent exhaust throttle control in a naturally-aspirated range of said engine, and to enlarge said overlap period via said valve timing changing mechanism when said independent exhaust throttle control is performed such that an overlap period at which said independent exhaust throttle control is performed in said naturally-aspirated range is larger than an overlap period at which said independent exhaust throttle control is not performed in said naturally-aspirated range.

4. The engine system with turbocharger of claim 1,
wherein the system further comprises the valve timing changing mechanism is capable of changing at least one of intake and exhaust valve opening or closing timing, and a fuel injector capable of changing an injected fuel amount to change an air-fuel ratio of a mixture provided in a combustion chamber of said engine, wherein said controller is further configured to perform an afterburning mode when said independent exhaust throttle control is performed, in which said controller controls said fuel injector to increase the air-fuel ratio in said combustion chamber to a richer than stoichiometric value and controls said valve timing changing mechanism to enlarge an overlap period wherein both of an intake valve and the exhaust valve are opened to or above a predetermined range such that an unburned fuel is exhausted from said engine and combusted at an upstream side of said exhaust turbocharger.

5. The engine system with turbocharger of claim 4,
wherein the system further comprises an electric supercharger provided in an air intake passage of said engine, wherein said controller is configured to activate said electric supercharger when said overlap period is within torque stationary range in said afterburning mode.

6. The engine system with turbocharger of claim 4, wherein said controller is configured to adjust said overlap period to more than a ninety-degree crank angle in said afterburning mode.

* * * * *